(12) United States Patent
Yokoyama et al.

(10) Patent No.: US 10,507,692 B2
(45) Date of Patent: Dec. 17, 2019

(54) RUBBER COMPOUND FOR TIRES, PNEUMATIC TIRE, AND AN AIRLESS TIRE

(71) Applicant: SUMITOMO RUBBER INDUSTRIES, LTD., Kobe-shi, Hyogo (JP)

(72) Inventors: Yuka Yokoyama, Kobe (JP); Mutsuki Sugimoto, Kobe (JP); Wako Iwamura, Kobe (JP); Makoto Sugiya, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 98 days.

(21) Appl. No.: 15/517,130

(22) PCT Filed: Sep. 30, 2015

(86) PCT No.: PCT/JP2015/077765
§ 371 (c)(1),
(2) Date: Apr. 5, 2017

(87) PCT Pub. No.: WO2016/056444
PCT Pub. Date: Apr. 14, 2016

(65) Prior Publication Data
US 2017/0305192 A1    Oct. 26, 2017

(30) Foreign Application Priority Data
Oct. 6, 2014 (JP) .................. 2014-205811

(51) Int. Cl.
*B60C 1/00* (2006.01)
*B60B 9/26* (2006.01)
(Continued)

(52) U.S. Cl.
CPC .......... *B60C 1/0016* (2013.01); *B60C 1/0008* (2013.01); *B60C 1/0025* (2013.01);
(Continued)

(58) Field of Classification Search
CPC .............................. B60C 1/0016; B60C 7/102
See application file for complete search history.

(56) References Cited

U.S. PATENT DOCUMENTS

2002/0014295 A1    2/2002    Tanaka
2005/0241742 A1    11/2005   Tsuruta et al.
(Continued)

FOREIGN PATENT DOCUMENTS

EP    0882738 A1    12/1998
EP    1790688 A1    5/2007
(Continued)

OTHER PUBLICATIONS

Yougun, English machine translation of JP 2007-296870 (2007).*
Extended European Search Report, dated Mar. 23, 2018, for European Application No. 15849011.0.

*Primary Examiner* — Peter F Godenschwager
(74) *Attorney, Agent, or Firm* — Birch, Stewart, Kolasch & Birch, LLP

(57) ABSTRACT

To provide a rubber compound for tires, a pneumatic tire and an airless tire capable of improving the steering stability of the tire while exerting excellent low fuel consumption performance. A rubber compound for tires characterized in that, of vulcanized rubber's physical properties, a complex elastic modulus $E^*_{70}$ (unit: MPa) and a loss tangent $\tan \delta_{70}$ under initial strain of 10%, dynamic strain of 2% and temperature of 70 degrees C., satisfy $90 < E^*_{70} < 250$, and $E^*_{70}/\tan \delta_{70} > 800$. A pneumatic tire provided with a rubber member made of the above-mentioned rubber compound. An airless tire provided with a rubber member made of the above-mentioned rubber compound. An airless tire provided in a tread ring with a shear rubber layer made of the above-mentioned rubber compound.

20 Claims, 7 Drawing Sheets

(51) Int. Cl.
*B60C 7/00* (2006.01)
*B60C 15/06* (2006.01)
*B60C 17/00* (2006.01)

(52) U.S. Cl.
CPC ............... *B60C 2001/0033* (2013.01); *B60C 2001/0091* (2013.01)

(56) References Cited

U.S. PATENT DOCUMENTS

| | | |
|---|---|---|
| 2010/0096061 A1 | 4/2010 | Durif |
| 2010/0200131 A1 | 8/2010 | Iwase et al. |
| 2013/0303657 A1 | 11/2013 | Miyazaki |

FOREIGN PATENT DOCUMENTS

| | | |
|---|---|---|
| EP | 2716700 A1 | 4/2014 |
| JP | 7-47806 A | 2/1995 |
| JP | 7-144508 A | 6/1995 |
| JP | 2002-12004 A | 1/2002 |
| JP | 2004-83001 A | 3/2004 |
| JP | 2007-296870 A | 11/2007 |
| JP | 2009-35051 A | 2/2009 |
| JP | 2009-127041 A | 6/2009 |
| JP | 2010-511560 A | 4/2010 |
| JP | 2012-97280 A | 5/2012 |
| JP | 2013-221052 A | 10/2013 |
| JP | 2013-253222 A | 12/2013 |

\* cited by examiner

RUBBER COMPOUND FOR TIRES, PNEUMATIC TIRE, AND AN AIRLESS TIRE

TECHNICAL FIELD

The present invention relates to a rubber compound for tires, a pneumatic tire, and an airless tire capable of improving the steering stability of the tire while exerting excellent low fuel consumption performance.

BACKGROUND ART

Rubber compounds constituting rubber members for tires, for example vulcanized rubber compounds used inside a tire such as a bead apex, is required to have high rigidity in order to improve the steering stability.

For the purpose of increasing rigidity of vulcanized rubber compounds, there have been proposed adding a large amount of filler, adding a thermosetting resin (patent document 1), adding fibrous fillers (patent document 2), blending butadiene rubber comprising 1, 2-syndiotactic polybutadiene crystals (sPB) (patent document 3).

However, the above listed methods tend to deteriorate the low fuel consumption property which is an important performance requirement.

For example, a rubber compound having a complex elastic modulus higher than 90 MPa, significantly deteriorates the low fuel consumption properties, therefore, it is difficult to use it for a tire practically.

In view of the above, the inventors of the present invention have conducted various researches. As a result, the inventors of the present invention have succeeded in providing a rubber compound capable of satisfying both high elasticity and low fuel consumption property in a range previously not reached by improving combination of materials composing the rubber compound which have been individually known (hereafter, may be referred to as "compounding tuning").

PRIOR ART DOCUMENT

Patent Document

Patent document 1: Japanese Patent Application Publication No. 2009-127041
Patent document 2: Japanese Patent Application Publication No. 2013-253222
Patent document 3: Japanese Patent Application Publication No. 2012-97280

SUMMARY OF THE INVENTION

Problems to be Solved by the Invention

It is an object of the present invention to provide a rubber compound for tires, a pneumatic tire and an airless tire capable of improving steering stability while exerting excellent low fuel consumption property.

Means for Solving the Problem

The present invention is a rubber compound for tires characterized in that,
of vulcanized rubber's physical properties, a complex elastic modulus $E^*_{70}$ (unit: MPa) and a loss tangent tan $\delta_{70}$ under an initial strain of 10%, a dynamic strain of 2%, and a temperature of 70 degrees C., satisfy the following expressions (1) and (2):

$$90 < E^*_{70} < 250 \tag{1}$$

$$E^*_{70}/\tan \delta_{70} > 800 \tag{2}$$

In another aspect of the present invention, the rubber compound is characterized in that,
of vulcanized rubber's physical properties,
a complex elastic modulus $E^*_{30}$ (unit: MPa) under the initial strain of 10%, the dynamic strain of 2%, and the temperature of 30 degrees C., and
a complex elastic modulus $E^*_{100}$ (unit: MPa) under the initial strain of 10%, the dynamic strain of 2%, and the temperature of 100 degrees C. can satisfy a following expression (3):

$$E^*_{100}/E^*_{30} > 0.8 \tag{3}$$

In another aspect of the present invention, the rubber compound is characterized in that,
of vulcanized rubber's physical properties,
a breaking elongation $EB_X$ in an x-axis direction which is a rubber extruded direction,
a breaking elongation $EB_Y$ in a Y-axis direction orthogonal to the x-axis direction, and
a breaking elongation $EB_Z$ in a z-axis direction orthogonal to the x-axis direction and the Y-axis direction can satisfy following expressions (4) and (5):

$$0.85 < EB_X/EB_Y < 1.2 \tag{4}$$

$$0.85 < EB_X/EB_Z < 1.2 \tag{5}$$

In another aspect of the present invention, the rubber compound is characterized in that,
of vulcanized rubber's properties,
a breaking strength $TB_X$ in the x-axis direction which is the rubber extruded direction,
a breaking strength $TB_Y$ in the Y-axis direction perpendicular to the x-axis direction, and
a breaking strength $TB_Z$ in the z-axis direction perpendicular to the x-axis direction and the Y-axis direction can satisfy following expressions (6) and (7):

$$0.85 < TB_X/TB_Y < 1.2 \tag{6}$$

$$0.85 < TB_X/TB_Z < 1.2 \tag{7}$$

In another aspect of the present invention, the rubber compound for tires is characterized in that,
of vulcanized rubber's physical properties, a volume resistivity value may be less than $1 \times 10^8$ ohm cm.

In another aspect of the present invention, a pneumatic tire is provided which comprises a rubber member made of the rubber compound for tires as set forth in any one of claims 1-5.

In another aspect of the present invention, an airless tire is provided which comprises a rubber member made of the rubber compound for tires as set forth in any one of claims 1-5.

Another aspect of the present invention is an airless tire comprising
a cylindrical tread ring provided with a ground contacting surface,
a hub disposed radially inside the tread ring and fixed to a vehicle axle, and
a spoke connecting the tread ring and the hub, characterized in that,
the tread ring comprises
a tread rubber forming the ground contacting surface,
an outer reinforcing cord layer disposed closest to the tread rubber, an inner reinforcing cord layer disposed radially inside the outer reinforcing cord layer, and a shearing rubber layer disposed between the outer reinforcing cord layer and the inner reinforcing cord layer, the shearing rubber layer has a complex elastic modulus $E^*_{70}$ (unit: MPa) and a loss tangent tan $\delta_{70}$ under an initial strain of 10%, a dynamic strain of 2%, and a temperature of 70 degrees C. which satisfy following expressions (1) and (2):

$$90<E^*_{70}<250 \quad (1)$$

$$E^*_{70}/\tan \delta_{70}>800 \quad (2).$$

In another aspect of the present invention, the shearing rubber layer has a complex elastic modulus $E^*_{30}$ (unit: MPa) under the initial strain of 10%, the dynamic strain of 2%, and the temperature of 30 degrees C., and a complex elastic modulus $E^*_{100}$ (unit: MPa) under the initial strain of 10%, the dynamic strain of 2%, and the temperature of 100 degrees C.

which can satisfy a following expression (3):

$$E^*_{100}/E^*_{30}>0.8 \quad (3).$$

In another aspect of the present invention, the shearing rubber layer has a breaking elongation $EB_X$ in the tire circumferential direction and a breaking elongation $EB_Y$ in the tire axial direction which satisfy a following expression (4), and a breaking strength $EB_X$ in the tire circumferential direction and a breaking strength $EB_Y$ in the tire axial direction which satisfy a following expression (5):

$$0.85<EB_X/EB_Y<1.2 \quad (4)$$

$$0.85<TB_X/TB_Y<1.2 \quad (5).$$

In another aspect of the present invention, the shearing rubber layer has a volume resistivity which may be less than $1\times10^8$ ohm cm.

In another aspect of the present invention, reinforcing cords of the outer reinforcing cord layer and reinforcing cords of the inner reinforcing cord layer may be steel cords.

In another aspect of the present invention, it is possible that the outer reinforcing cord layer comprise a first cord ply including first reinforcing cords arranged to incline with respect to the tire circumferential direction, and a second cord ply disposed radially outside the first cord ply and including second reinforcing cords arranged to incline with respect to the tire circumferential direction at the same angle as and to the opposite direction to the first reinforcing cords, and the inner reinforcing cord layer comprises a third cord ply including third reinforcing cords arranged in parallel with the tire circumferential direction or the tire axial direction.

In another aspect of the present invention, the outer reinforcing cord layer can further comprise a fourth cord ply disposed radially outside the second cord ply and including fourth reinforcing cords.

In another aspect of the present invention, it may be possible that the fourth reinforcing cords are arranged in parallel with the tire circumferential direction, and an elastic modulus of the fourth reinforcing cords is not greater than elastic moduli of the first reinforcing cords and the second reinforcing cords.

In another aspect of the present invention, the outer reinforcing cord layer can further comprises a fifth cord ply disposed radially inside the first cord ply and including fifth reinforcing cords.

In another aspect of the present invention, the fifth reinforcing cords may be arranged in parallel with the tire circumferential direction.

In another aspect of the present invention, the third reinforcing cords may be arranged in parallel with the tire circumferential direction.

In another aspect of the present invention, an angle θ of the first reinforcing cords with respect to the tire circumferential direction may be 5 to 85 degrees.

In another aspect of the present invention, it may be possible that a radial distance between the reinforcing cord disposed radially innermost among the reinforcing cords of the outer reinforcing cord layer and the reinforcing cord disposed radially outermost among the reinforcing cords of the inner reinforcing cord layer is not less than 3 mm.

Advantageous Effects of the Invention

The rubber compound for tires according to the present invention has the complex elastic modulus $E^*_{70}$ and the loss tangent tan $\delta_{70}$ which satisfy the above expression (1) and (2). Therefore, in the rubber compound for tires, high elasticity and low fuel consumption property are satisfied in a range previously not obtained. Accordingly, the rubber compound for tires according to the present invention can improve the steering stability while exerting excellent low fuel consumption property.

Further, the airless tire using the rubber compound for tires according to the present invention can be decreased in the rolling resistance while ensuring excellent steering stability.

MODE FOR CARRYING OUT THE INVENTION

An embodiment of the present invention will now be described in detail in conjunction with accompanying drawings.

First Embodiment

Figure 1:
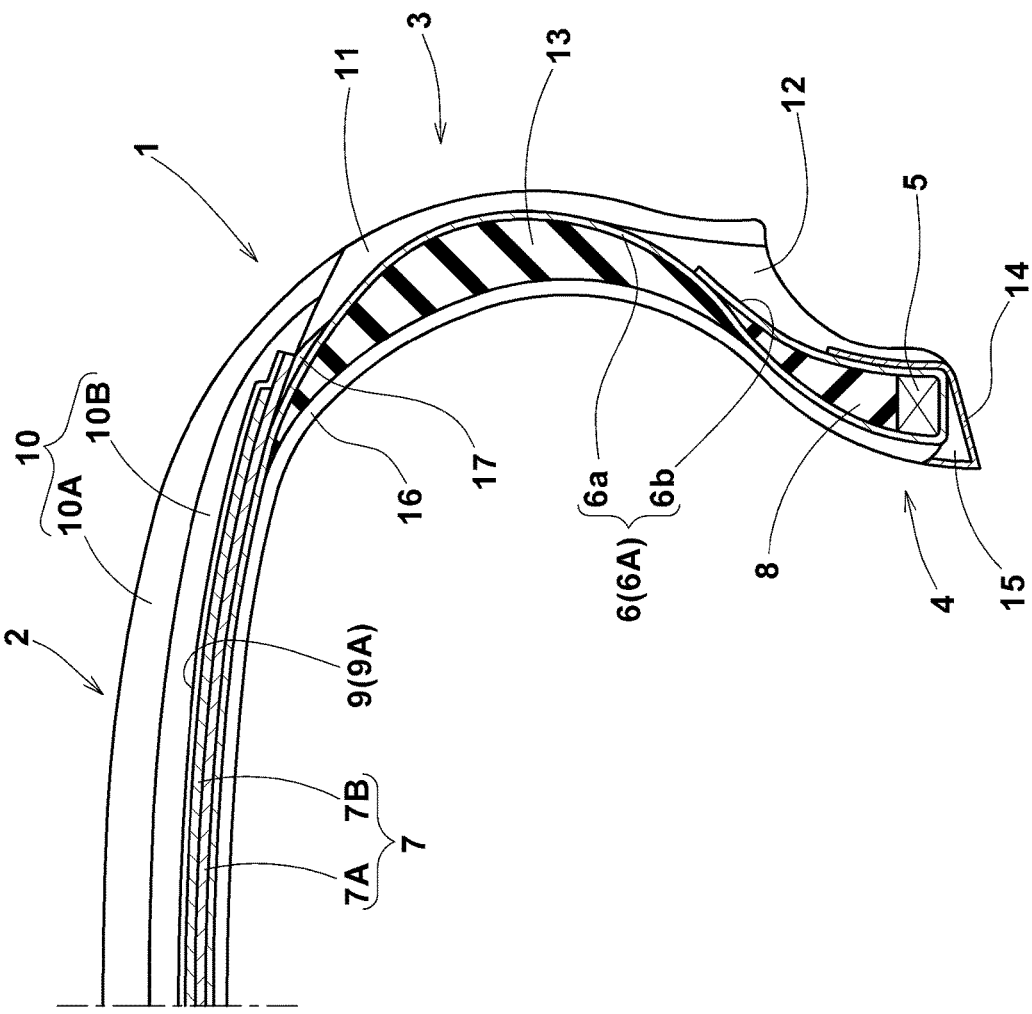
FIG. 1 a cross-sectional view of a pneumatic tire according to the first embodiment of the present invention.

As shown in FIG. 1, the pneumatic tire according to the present embodiment is a run flat tire comprising a rubber member and a reinforcing cord member.

The reinforcing cord member includes a carcass 6 extending from a tread portion 2 to bead core 5 of a bead portion 4 through a sidewall portion 3, and a belt layer 7 disposed radially outside the carcass 6 and in the inside of the tread portion 2.

The carcass 6 is composed of at least one carcass ply 6A of carcass cords arranged at an angle of 70 to 90 degrees, for example, with respect to the tire circumferential direction. The carcass ply 6A comprises a toroidal ply main portion 6a extending between the bead cores 5, 5 and a ply turnup portion 6b turned up around the bead core 5.

The belt layer 7 is composed of at least two belt plies 7A and 7B of belt cords arranged at angles of 10 to 35 degrees, for example, with respect to the tire circumferential direction. The respective belt cords intersect with each other between the plies in order to increase the belt rigidity.

In the present embodiment, the reinforcing cord member includes a band layer 9 for improving the high speed performance and the like. The band layer 9 is composed of at least one band ply of a band cord spirally wound on the outside of the belt layer 7.

The rubber member includes, for example, a bead apex 8 having a triangular cross section and extending radially outwardly from the bead core 5, a tread rubber 10 composed of a cap tread rubber 10A forming the outer surface of the tread portion 2 and a base tread rubber 10B disposed radially inside the cap tread rubber 10A, a sidewall rubber 11 forming the outer surface of the sidewall portion 3, and a clinch apex rubber 12 having a triangular cross section and forming the outer surface of the bead portion 4.

Aside from those described above, the rubber member can include as appropriate, for example, a run flat reinforcing rubber 13 having a falcate cross section and disposed axially inside the carcass 6 for supporting a part of the tire load when punctured, a chafer rubber 14 for preventing rim chafing, forming the bead bottom surface, an insulation rubber 15 disposed between the chafer rubber 14 and the carcass 6, an inner liner rubber 16 having low air permeability and forming the inner surface of the tire, a breaker cushion rubber 17 having a triangular cross section and disposed between the outer edge portion of the belt layer 7 and the carcass, and an under tread rubber (not shown) disposed between the tread rubber 10 and the band layer 9.

The rubber compound G (not shown in the figures) of the present invention can be used for at least one of the above described rubber members.

It is preferred that the rubber compound G is used for rubber members disposed inside the tread portion 2 and the sidewall portion 3, and not exposed to the outside of the tire.

It is especially preferred that the rubber compound G can be used for rubber members, for which high rigidity is required among the rubber members inside the tire, for example, the bead apex 8, the base tread rubber 10B, the clinch apex rubber 12 and the run flat reinforcing rubber 13.

Next, the rubber compound G of the present invention will be described.

<Satisfying Both High Rigidity and Low Fuel Consumption Property>

The rubber compound G has characteristics of high rigidity and low fuel consumption specified in vulcanized rubber's physical properties.

Specifically, the rubber compound G has a complex elastic modulus $E^*_{70}$ (unit: MPa) and a loss tangent $\tan \delta_{70}$ under the initial strain of 10%, the dynamic strain of 2% and the temperature of 70 degrees C., which satisfy the following expressions (1) and (2):

$$90 < E^*_{70} < 250 \quad (1)$$

$$E^*_{70}/\tan \delta_{70} > 800 \quad (2).$$

Therefore, the rubber compound G can increase the rigidity of the tire and improve the steering stability while exerting an excellent low fuel consumption property. Further, the complex elastic modulus and the loss tangent of the rubber compound G are defined under the temperature of 70 degrees C., they represent performance on practical cars more accurately.

If the complex elastic modulus $E^*_{70}$ of the rubber compound G is not greater than 90 MPa, the steering stability is not improved enough, deformation of the tire itself becomes large, and there is a tendency that the low fuel consumption property and anti-temperature-dependence of tire performance are deteriorated.

If the complex elastic modulus $E^*_{70}$ is not less than 250 MPa, difference in physical properties from other rubber member adjacent thereto becomes large, and there is a possibility that the durability is deteriorated.

From this point of view, the complex elastic modulus $E^*_{70}$ is preferably not less than 95 Mpa, more preferably not less than 100 MPa, and preferably not greater than 200 Mpa, more preferably not greater than 180 Mpa.

If the ratio $E^*_{70}/\tan \delta_{70}$ of the rubber compound G is not greater than 800, the steering stability is improved but the low fuel consumption property cannot be obtained. Further, the rubber compound G itself is easy to generate heat, therefore, the anti-temperature-dependence of tire performance tends to deteriorate.

From this point of view, the ratio $E^*_{70}/\tan \delta_{70}$ is preferably not less than 900, more preferably not less than 1000. The upper limit for the ratio $E^*_{70}/\tan \delta_{70}$ is not particularly provided, but it is preferably not greater than 2000 from the point of view of cost and processability.

The direction in measuring the complex elastic modulus and the loss tangent of the rubber compound G are not particularly limited but typically it is preferred that they are measured in the extruded direction when forming the rubber.

<Temperature Dependency>

It is preferred that the rubber compound G has a complex elastic modulus $E^*_{30}$ under an initial strain of 10%, a dynamic strain of 2%, and a temperature of 30 degrees C., and a complex elastic modulus $E^*_{100}$ under an initial strain of 10%, a dynamic strain of 2%, and a temperature of 100 degrees C. which satisfy the following expression (3):

$$E^*_{100}/E^*_{30} > 0.8 \quad (3).$$

The temperature of a rubber member disposed inside the tire rises greatly during running at a high speed, and there is a possibility that the temperature reaches 100 degrees C. even under normal running conditions.

On the other hand, usually, a rubber compound for tires has a glass transition temperature Tg lower than zero degree C., and, under the temperature higher than normal temperature, there is a temperature dependency such that the complex elastic modulus $E^*$ gradually decreases as the temperature increases. Therefore, it is important for the steering stability that the complex elastic modulus $E^*$ of the rubber compound for tires does not change greatly in a temperature range from normal temperature to 100 degrees C.

For this reason, it is preferable for the rubber compound G that the ratio $E^*_{30}/E^*_{100}$ of the complex elastic modulus $E^*m$ under a temperature of 30 degrees C. and the complex elastic modulus $E^*_{100}$ under a temperature of 100 degrees C. is greater than 0.8. Thereby, it becomes possible to obtain the steering stability which is stable through all temperature ranges and under a driving condition long time from the start of driving.

Further, as the rubber compound G satisfies the expression (2), it does not generate a great amount of heat by itself, and it is possible to exert excellent steering stability during running at a high speed. More preferably, the ratio $E^*_{30}/E^*_{100}$ is not less than 0.9 and not greater than 1.22, more preferably not greater than 1.20.

<Isotropy>

If the rubber compound has strong anisotropy with respect to the breaking elongation and the breaking strength, then there is a tendency that stress and deformation concentrate in a direction in which the anisotropy is weak. Therefor, it is difficult to fully exert the tire performance and durability. For this reason, it is preferred that, with respect to the breaking elongation of the rubber compound G, the breaking elongation $EB_X$ in the x-axis direction which is the rubber extruded direction, the breaking elongation $EB_Y$ in the Y-axis direction orthogonal to the x-axis direction, and the breaking elongation $EB_Z$ in the z-axis direction orthogonal to the x-axis direction and the Y-axis direction satisfy the following expressions (4) and (5):

$$0.85 < EB_X/EB_Y < 1.2 \quad (4)$$

$$0.85 < EB_X/EB_Z < 1.2 \quad (5).$$

Similarly, it is preferred that, with respect to the breaking strength of the rubber compound G, the breaking strength $EB_X$ in the x-axis direction which is the rubber extruded direction, the breaking strength $TB_Y$ in the Y-axis direction perpendicular to the x-axis direction, and the breaking strength $TB_Z$ in the z-axis direction perpendicular to the x-axis direction and the Y-axis direction satisfy the following expressions (6) and (7):

$$0.85 < TB_X/TB_Y < 1.2 \quad (6)$$

$$0.85 < TB_X/TB_Z < 1.2 \quad (7).$$

By satisfying the above expressions, excellent isotropy of the rubber compound G is secured, and it is possible to obtain good tire performance and the like.

<Electric Conductivity>

If the electric resistance of the tire is large, static electricity accumulates in a car body, and there is a possibility that radio disturbance such as radio noise occurs. Therefore, it is preferred that the volume resistivity value of the rubber compound G is less than $1 \times 10^8$ ohm cm in order to prevent electro static charge from accumulating in the tire. The lower limit for the volume resistivity value is not particularly provided.

Next, the composition of the rubber compound G of the present invention will be described.

The rubber compound G is composed of a rubber component (polymer), a filler (reinforcing material) and a cross-linking agent at least.

As the rubber component (polymer), for example, natural rubber (NR), isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), isobutylene-isoprene rubber (IIR), and halogenated butyl rubber (X-IIR), etc. can be cited. These may be used alone or as a mixture of two or more kinds of them.

It is preferred that the rubber compound G contains NR in order to decrease the loss tangent tan δ and improve the low fuel consumption property.

In this case, in 100 parts by mass of the rubber component, the proportion of NR is preferably not less than 40 parts by mass, more preferably not less than 50 parts by mass, most preferably 100 parts by mass.

As the NR, unmodified natural rubber (unmodified NR) and modified natural rubber (modified NR) can be used. Regarding the unmodified NR, it is preferred that highly purified NR is used. In the highly purified NR, filler is highly dispersed to reach the ultrafine domain, and thereby the low fuel consumption property is further improved and it is possible to improve the isotropy of the physical property.

The highly purifying method is not particularly limited, and it is possible to use, for example, a mechanical method such as centrifugation, a method for decomposing impurities such as protein by an enzyme, an impurity separation by saponification, etc.

It is preferred that the highly purified NR has a phosphorus content of not greater than 200 ppm, and the pH of the rubber is 2 to 7 in order to further improve the low fuel consumption property, heat resistance, rubber strength, and processability.

Regarding the modified NR, suitably used are an epoxidized natural rubber (ENR) a part of the double bonds of which is epoxidized, and a hydrogenated natural rubber (HNR) a part of the double bonds of which is hydrogenated. These modified NRs are increased in the affinity with filler to improve the low fuel consumption property, and can improve the isotropy of the physical properties. Further, the modified NR is increased in the interaction with the filler, and exerts excellent mechanical strength.

Regarding the ENR, the epoxidation rate in the double bonds is preferably not greater than 50%, more preferably not greater than 30%, still more preferably not greater than 20%. If the epoxidation rate is greater than 50%, there is a possibility that the effects on the low fuel consumption property are deteriorated.

Regarding the HNR, the ratio of hydrogenation (hydrogenation rate) is preferably not greater than 99%, more preferably not greater than 98%. If the hydrogenation rate is greater than 99%, there is a possibility that the rubber elasticity is deteriorated. The lower limit for the ratio of epoxidation and hydrogenation is not particularly specified.

If the NR is mixed with other rubber, diene rubber such as BR and SBR can be suitably used. Regarding the diene rubber, modified diene rubber whose terminal is modified with a polar group can be used.

Next, it is preferred that carbon black is included as the filler (reinforcing agent). Thereby, it is possible to obtain an excellent reinforcing effect on the rubber compound G and decrease the electric resistance of the rubber compound G.

From the point of view of the low fuel consumption property, carbon black having large structure whose DBP absorption is not less than 130 ml/100 g is suitably used. The DBP absorption is more preferably not less than 150 ml/100 g, still more preferably not less than 170 ml/100 g. Carbon black having large structure is excellent in dispersibility, therefore, it is possible to exert the high electric conductivity and improve the low fuel consumption property.

Examples of such carbon black are,
Printex XE2B manufactured by Evonik Industries,
3030, #3050 and #3230 manufactured by Mitsubishi Chemical Corporation, and
VP, VXC305, VXC500 manufactured by Cabot Corporation, for example, but it is not limited to these.

A nitrogen adsorption specific surface area (N2SA) of the carbon black is preferably in a range of 10 to 280 $m^2/g$, more preferably in a range of 20 to 250 $m^2/g$. If the N2SA of the carbon black is less than 10 $m^2/g$, weather resistance is not satisfactory and the wear resistance tends to deteriorate. On the other hand, if the N2SA is greater than 280 $m^2/g$, the dispersibility is deteriorated, therefore, the low fuel consumption property tends to deteriorate.

The nitrogen adsorption specific surface area is measured by the "A" method of JIS K6217. Further, the particle size of the carbon black is not particularly limited, and GPF, FEF, HAF, ISAF, SAF, etc. can be used.

Furthermore, regarding the carbon black, nano carbon such as fullerene, carbon nanotubes, and nanodiamond can be used, for example. Nano carbon is excellent in reinforcement, therefore, a little amount of it can improve the low fuel consumption property while increasing the complex elastic modulus of the rubber compound G. Nano carbon can be used with regular carbon (other carbon than nano carbon).

If carbon black is used, it is preferred to add a carbon coupling agent which reacts with functional groups of both carbon black and the rubber component. Thereby, the reinforcing effect of the rubber compound is further increased, therefore, it is possible to improve the complex elastic modulus and the low fuel consumption property of the rubber compound while decreasing the blending amount of the carbon black. Further, as the blending amount of carbon black is decreased, the isotropy of the rubber physical property is improved.

Examples of the carbon coupling agent are imidazoles having a reactive functional group with the rubber component such as
1, 2-Bis(benzimidazolyl-2) ethane,
Bis(benzimidazolyl-2)alkylpolysulfide,
1, 4'-Bis(mercaptobenzimidazolyl-2)butane,
1, 6'-Bis(mercaptobenzimidazolyl-2)hexane,
α, α'-Bis(mercaptobenzimidazolyl-2)m-xylene, and
1, 4'-Bis(mercaptoimidazolyl-2)2-trans-butene, halogenated organic acids such as
4-Bromocrotonate, and
4-(Bromomethyl)phenylacetic acid, and silane compounds, for example.

The carbon coupling agent is however, not limited to these. These carbon coupling agents can be used alone or in combination of two or more kinds of them.

It is preferred that the rubber compound G contains silica as the filler (reinforcing material). Thereby, it is possible to obtain further excellent low fuel consumption property. From the point of view of securing electric conductivity of the rubber compound G, it is preferred that silica is used together with carbon black.

In this case, it is preferred that silica is used together with carbon black having large structure (DBP absorption is not less than 130 ml/100 g) from the point of view of electric conductivity.

When using silica, the content of the silica is not particularly limited, but it is preferably not less than 5 parts by mass, more preferably not less than 10 parts by mass with respect to 100 parts by mass of the rubber component. On the other hand, in order to obtain excellent processability, the silica is preferably not greater than 200 parts by mass, more preferably not greater than 180 parts by mass with respect to 100 parts by mass of the rubber component.

When using silica, it is preferred that the rubber compound G contains a silane coupling agent. In order to prevent processability from deteriorating while dispersing silica well, the content of the silane coupling agent is preferably not less than 0.5 parts by mass, more preferably not less than 1.5 parts by mass, still more preferably not less than 2.5 parts by mass, but preferably not greater than 20 parts by mass, more preferably not greater than 15 parts by mass, still more preferably not greater than 10 parts by mass with respect to 100 parts by mass of silica.

Examples of the silane coupling agent are sulfides such as
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(4-trimethoxysilylbutyl)tetrasulfide,
bis(3-triethoxysilylpropyl)trisulfide,
bis(2-triethoxysilylethyl)trisulfide,
bis(4-triethoxysilylbutyl)trisulfide,
bis(3-trimethoxysilylpropyl)trisulfide,
bis(2-trimethoxysilylethyl)trisulfide,
bis(4-trimethoxysilylbutyl)trisulfide,
bis(3-triethoxysilylpropyl)disulfide,
bis(2-triethoxysilylethyl)disulfide,
bis(4-triethoxysilylbutyl)disulfide,
bis(3-trimethoxysilylpropyl)disulfide,
bis(2-trimethoxysilylethyl)disulfide,
bis(4-trimethoxysilylbutyl)disulfide,
3-trimethoxysilylpropyl-N,
N-dimethylthiocarbamoyltetrasulfide
3-triethoxysilylpropyl-N,N-dimethylthiocarbamoyltetrasulfide,
2-triethoxysilylethyl-N,N-dimethylthiocarbamoyltetrasulfide,
2-trimethoxysilylethyl-N,N-dimethylthiocarbamoyltetrasulfide,
3-trimethoxysilylpropylbenzothiazolyltetrasulfide,
3-triethoxysilylpropylbenzothiazoletetrasulfide,
3-triethoxysilylpropylmethacrylatemonosulfide,
3-trimethoxysilylpropylmethacrylatemonosulfide,
mercaptans such as
2-mercaptoethyltrimethoxysilane,
2-mercaptoethyltriethoxysilane,
3-octanoylthio-1-propyltriethoxysilane,
vinyl-based agents such as
vinyltriethoxysilane, and
vinyltrimethoxysilane,
amino-based agents such as
3-aminopropyltrietoxysilane,
3-aminopropyltrimetoxysilane,
3-(2-aminoethyl)aminopropyltriethoxysilane,
3-(2-aminoethyl)aminopropyltrimethoxysilane,
glycidoxy-based agents such as
γ-glycidoxypropyltriethoxysilane,
γ-glycidoxypropyltrimethoxysilane,
γ-glycidoxypropylmethyldiethoxysilane,
γ-glycidoxypropylmethyldimethoxysilane,
nitro-based agents such as
3-nitropropyltrimethoxysilane,
3-nitropropyltriethoxysilane,
chloro-based agents such as
3-chloropropyltrimethoxysilane,
3-chloropropyltriethoxysilane,
2-chloroethyltrimethoxysilane, 2-chloroethyltriethoxysilane, for example.

Trade names of the examples of the silane coupling agents are
si69, si75, si266, si363 (manufactured by Evonik Degussa GmbH), NXT, NXT-LV, NXTULV, NXT-Z (manufactured by Momentive Performance Materials Inc.), and so on. These silane coupling agents may be used alone or in combination of two or more kinds of them.

As the cross-linking agent, sulfur, organic cross-linking agents, organic-inorganic hybrid cross-linking agents can be cited. In order to obtain both excellent rubber strength and isotropy of physical property, preferably used are the organic cross-linking agents or the organic-inorganic hybrid cross-linking agents.

As examples of the organic and the organic-inorganic hybrid cross-linking agents,
thermo-setting resins such as resorcinol resins, cresol resins, phenolic resins, and melamine resins,
maleimide compounds,
alkylphenol-sulfur chloride condensates,
organic peroxides,
organic amine organo sulfides and the like can be cited.

However, the cross-linking agent is not limited to these. As particularly preferred examples of commercially available cross-linking agents, PERKALINK900 manufactured by FlexSys Inc., DURALINK HTS manufactured by Flexsys Inc., Vulcuren VP KA9188 manufactured by Lanxess AG, Tackirol V200 manufactured by Taoka Chemical Co., Ltd., and so on can be cited, but not limited to these. These cross-linking agents may be used alone or in combination of two or more kinds of them. Further sulfur may be used together.

It is preferred that the rubber compound G further contains zinc oxide. Zinc oxide has an effect of smooth vulcanization and increasing the rigidity and the isotropy of the physical properties.

As the zinc oxide,
zinc oxide (GINREI R manufactured by Toho Zinc Co., Ltd., zinc oxide manufactured by Mitsui Mining & Smelting Co., Ltd., etc.), nano-particle zinc oxide (ZINCOX SUPER F-2 manufactured by HakusuiTech Co., Ltd., etc.), and so on, which have been used in the rubber industry,
can be cited, and these can be used alone or in combination of two or more kinds of them.

As zinc oxide, nano-particle zinc oxide is preferred from the point of view of the balance between increase in the complex elastic module and other physical properties.

In order to increase the dispersibility, the average particle diameter of the nano-particle zinc oxide is preferably not less than 20 nm, more preferably not less than 50 nm, and preferably not greater than 200 nm, more preferably not greater than 150 nm.

The content of the zinc oxide is preferably not less than 1.0 parts by mass, more preferably not less than 2.0 parts by mass, and preferably not greater than 3.7 parts by mass, more preferably not greater than 3.0 parts by mass with respect to 100 parts by mass of the rubber component in order to prevent the breaking strength from deteriorating while obtaining satisfactory hardness (Hs) of the rubber compound G.

It is preferred that the rubber compound G further contains a plasticizer. As the plasticizer, for example, oil, liquid polymer, fluid resin and so on can be cited, and they improve the processability of the rubber. Although the type of the plasticizer is not particularly limited, the liquid polymer is preferred from the point of view of improving the rigidity and the mechanical strength.

As the liquid polymer, in order to increase the affinity with the rubber component, for example, low molecular diene-type polymers such as low molecular weight polyisoprene, low molecular weight polybutadiene, low molecular styrene-butadiene copolymer and the like are preferred. Especially, among the low molecular diene-type polymers, modified low molecular diene-type polymer whose principal chain and/or terminal is modified with a polar group is preferred. It has higher compatibility with the filler, and it is possible to increase the strength while improving the low fuel consumption property.

The composition of the rubber compound G of the present invention is not particularly limited, but, in order to satisfy the above mentioned expressions (1) and (2), it is desirable to employ the following compounding tunings
a) use highly-purified NR and modified NR (ENR, HNR, etc.) as the rubber component
b) use a combination of carbon black and a carbon coupling agent, and/or a combination of silica and a silane coupling agent as the filler
c) when using carbon black, use carbon black having large structure whose DBP absorption is not less than 130 ml/100 g and/or nano carbon such as fullerene and the like
d) use nano-particle zinc oxide as zinc oxide
e) use liquid polymer, especially modified low molecular diene-type polymer as the plasticizer.

Further, in order to obtain the rubber compound G satisfying the above mentioned expression (3), it is preferred to use highly purified NR and modified NR (ENR, HNR, etc.). Thereby, NR is strongly combined with the filler while taking advantage of its low temperature dependency, therefore, it is possible to satisfy both high elasticity and less temperature dependency with a small amount of the filler.

Furthermore, in order to obtain the rubber compound G satisfying the above-mentioned expression (4) to (7), it is preferred that the following compounding tunings are employed
a) use highly purified NR and modified NR (ENR, HNR, etc.) as the rubber component
b') Use combination of carbon black and a carbon coupling agent and/or combination of silica and a silane coupling agent as the filler so as to keep the filler blending amount low
c') use nano carbon as carbon black
f) use organic cross-linking agent or organic-inorganic hybrid cross-linking agent as the cross-linking agent.

When using the rubber compound for a tire, first, all the ingredients are kneaded by using a kneading machine such as a Banbury mixer, a kneader, an open mill, etc. so as to obtain an unvulcanized rubber compound. Then, the unvulcanized rubber compound is extruded to be formed into the intended shape of the rubber member.

Next, using the extruded unvulcanized rubber compound, an unvulcanized tire is formed on a tire building machine in the usual manner.

Then, by heating and pressurizing the unvulcanized tire within a vulcanizer, the tire 1 is obtained. It may be an airless (solid) tire as described later, although, in the present embodiment, the pneumatic tire is exemplified in FIG. 1.

Second Embodiment

In the present embodiment, an airless tire is provided, which is reduced in the rolling resistance while securing excellent steering stability.

Figure 2:
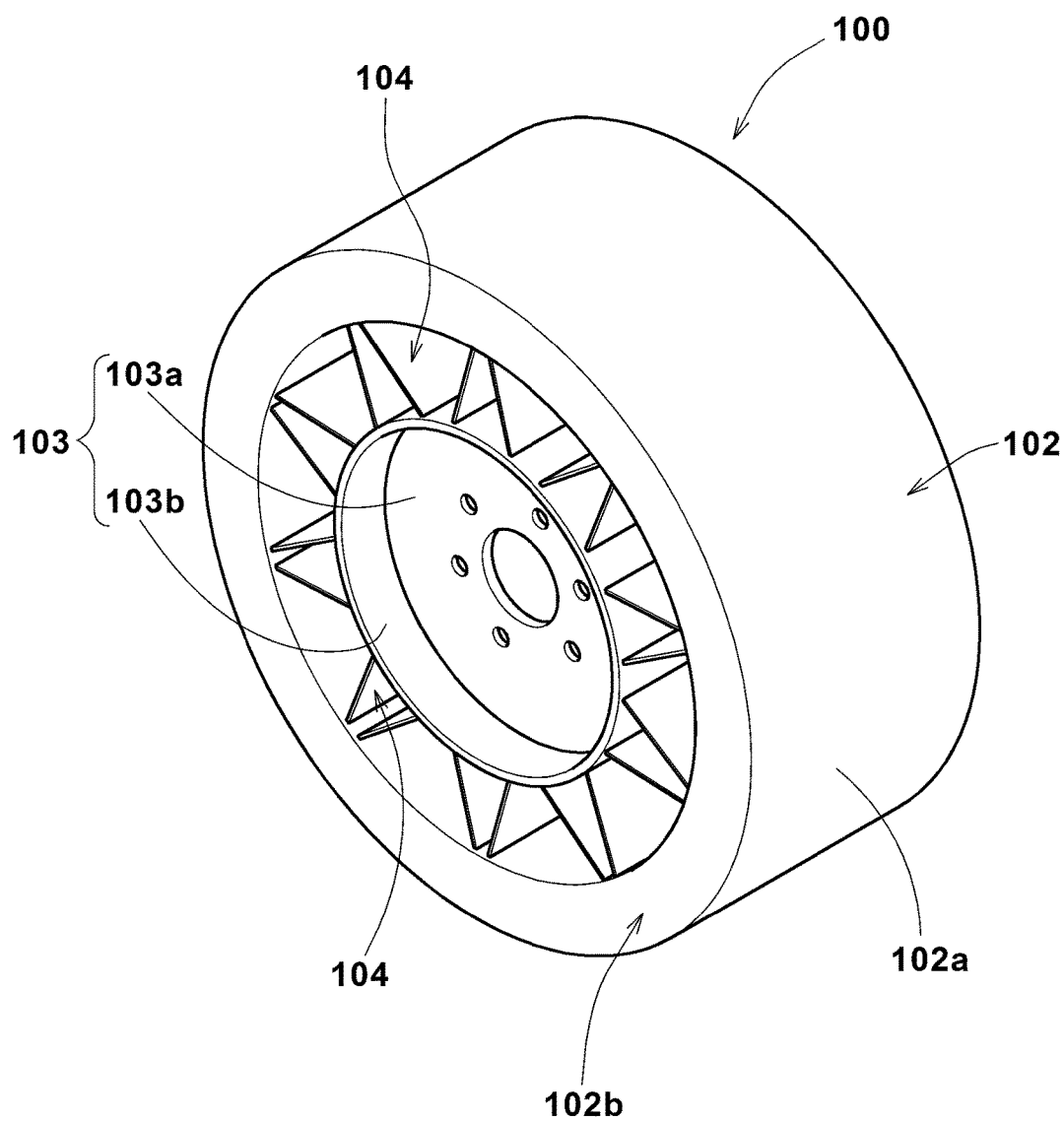
FIG. 2 a perspective view of an airless tire according to the second embodiment of the present invention.

As shown in FIG. 2, the airless tire 100 in the present embodiment comprises a cylindrical tread ring 102 provided with the ground contacting surface 102a, a hub 103 disposed radially inside the tread ring 102 and fixed to a vehicle axle, and a plurality of spokes 104 connecting the tread ring 102 and the hub 103.

In the present embodiment, the airless tire 100 is illustrated as a tire for passenger cars.

The hub 103 comprises a disc portion 103a and a cylinder portion 103b formed on the circumference of the disc portion 103a. The hub 103 can be made of a metal material, for example, steel, aluminum alloy, magnesium alloy and the like as with conventional tire wheels.

Each of the spokes 104 is formed by cast molding using high-polymer material. The spoke 104 has a plate-like shape, and a plurality of the spokes are arranged in the tire circumferential direction.

Figure 3:
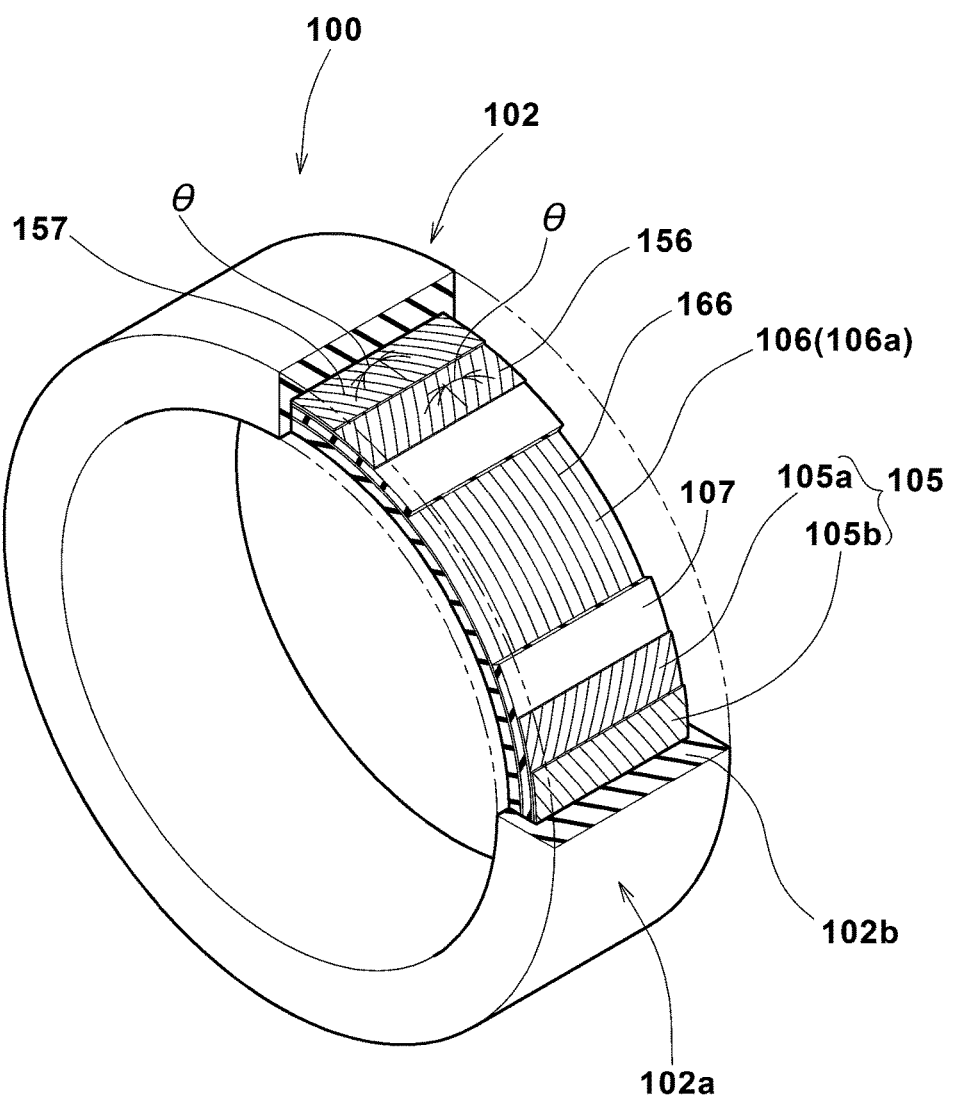
FIG. 3 a perspective view showing the tread ring in FIG. 2.
Figure 4:
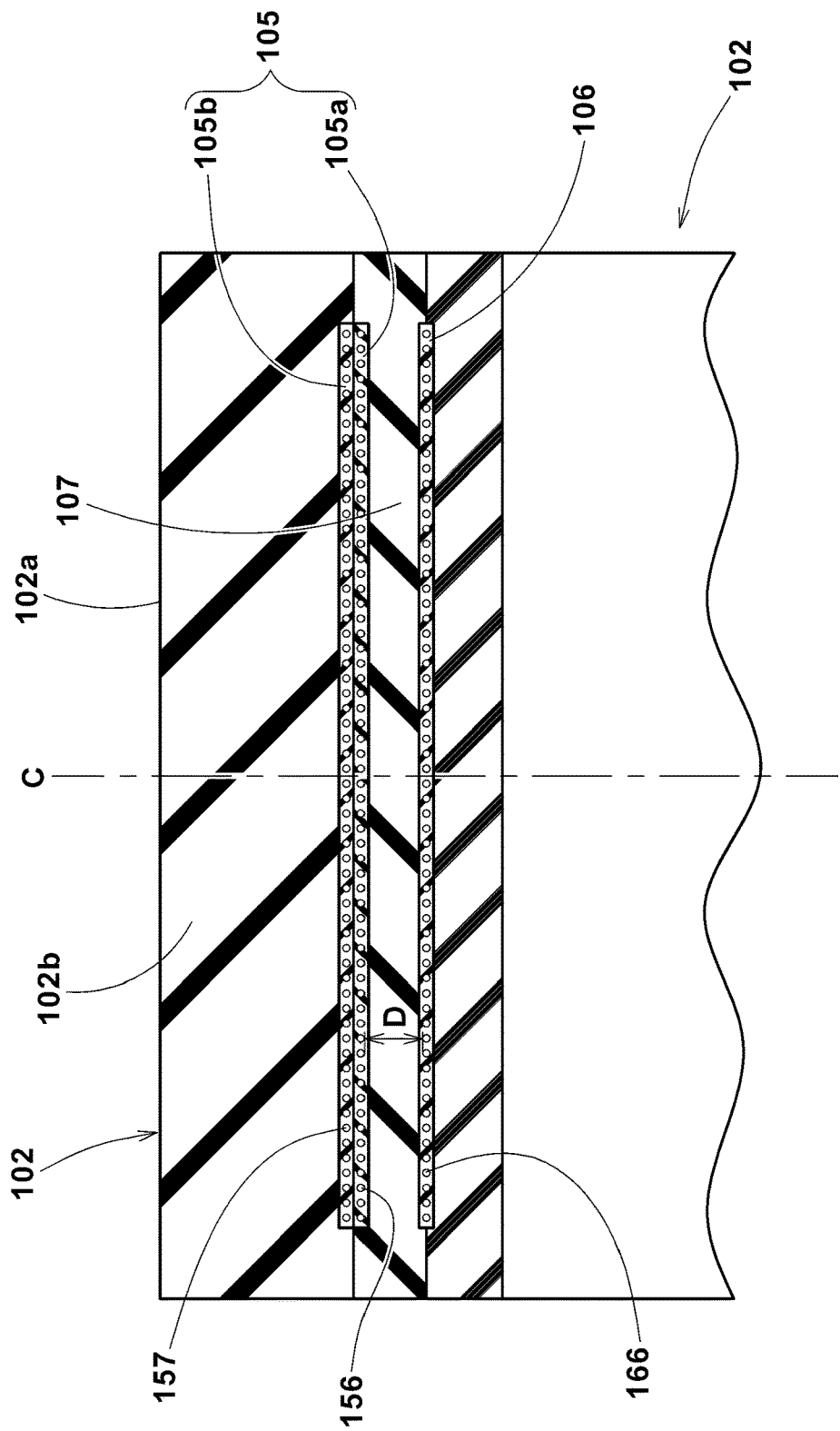
FIG. 4 a cross-sectional view of the tread ring in FIG. 3.

As shown in FIG. 3 and FIG. 4, the tread ring 102 comprises a tread rubber 102b forming the ground contacting surface 102a, an outer reinforcing cord layer 105 disposed closest to the tread rubber 102b, an inner reinforcing cord layer 106 disposed radially inside the outer reinforcing cord layer 105, and a shearing rubber layer 107 disposed between the outer reinforcing cord layer 105 and the inner reinforcing cord layer 106.

By the outer reinforcing cord layer 105 and the inner reinforcing cord layer 106, the shape of the tread ring 102 is maintained, and the load applied to the airless tire 100 is supported.

The ground contacting surface 102a, which is the outer surface of the tread ring 102, can be provided with tread grooves (not shown) in a variety of patterns in order to provide wet performance.

For the tread rubber 102b, rubber compounds excellent in friction against road surfaces and wear resistance can be suitably used.

In the present embodiment, as the number of ply of the outer reinforcing cord layer 105 is larger than the number of ply of the inner reinforcing cord layer 106 inside thereof, the rigidity of the ground contacting surface 21 is increased. Further, as the number of ply of the inner reinforcing cord layer 106 is smaller than the number of ply of the outer reinforcing cord layer 105, the tire is easily reduced in the weight.

The outer reinforcing cord layer 105 is composed of a first cord ply 105a and a second cord ply 105b disposed radially outside the first cord ply 105a.

In the present embodiment, the width of the first cord ply 105a in the tire axial direction is substantially the same as the width of the second cord ply 105b in the tire axial direction.

The expression "substantially the same" means at least a mode in which the difference in the width between the first cord ply 105a and the second cord ply 105b is not greater than 10 mm.

The first cord ply 105a comprises first reinforcing cords 156 arranged obliquely at an angle θ with respect to the tire circumferential direction. The first reinforcing cords 156 are covered with a topping rubber.

The second cord ply 105b comprises second reinforcing cords 157 arranged obliquely with respect to the tire circumferential direction at the same angle θ as and to the opposite direction to the first reinforcing cords 156. The second reinforcing cords 157 are covered with a topping rubber.

For the first reinforcing cords 156 and the second reinforcing cords 157, steel cords are suitably used for example.

Alternatively, high modulus organic fiber cords having high strength and high elastic modulus such as aramid, polyethylene naphthalate (PEN), polyethylene terephthalate (PET), etc. may be used.

The first reinforcing cords 156 and the second reinforcing cords 157 are arranged so as to intersect with each other. Thereby, the rigidity of the outer reinforcing cord layer 105 is increased, and it is possible to reinforce the tread ring 102 effectively.

Further, when a slip angle is given to the airless tire 100, as with the reinforcing belt cord layer of the pneumatic tire, the outer reinforcing cord layer 105 displays high resistance to in-plane torsion, and generates cornering power to exert excellent cornering performance.

The inner reinforcing cord layer 106 is composed of a third cord ply 106a comprising third reinforcing cords 166. The third reinforcing cords 166 are covered with a topping rubber.

In the present embodiment, the third reinforcing cords 166 are arranged in parallel with the tire circumferential direction.

Here, "parallel with the tire circumferential direction" means that the third reinforcing cords 166 are substantially in parallel with the tire circumferential direction, and the angle θ3 of the third reinforcing cords 166 with respect to the tire circumferential direction is, for example, θ+− about 5 degrees, considering the manufacturing tolerances.

For the third reinforcing cords 166, for example, steel cords can be suitably used, but organic fiber cords having a high modulus such as aramid, polyethylene naphthalate (PEN), polyethylene terephthalate (PET), etc. may be used.

Owing to the third reinforcing cords 166 arranged in the inner reinforcing cord layer 106, the rigidity in the tire circumferential direction of the tread ring 102 is increased. Thereby, the shape of the ground contacting surface 121 is stabilized during deceleration and acceleration, and the brake performance and the traction performance are improved. Further, the third cord ply 106a, which has the third reinforcing cords 166 arranged in parallel with the tire circumferential direction, can secure a symmetry about a tire circumferential line while achieving a weight reduction owing to the single ply.

Figure 5:
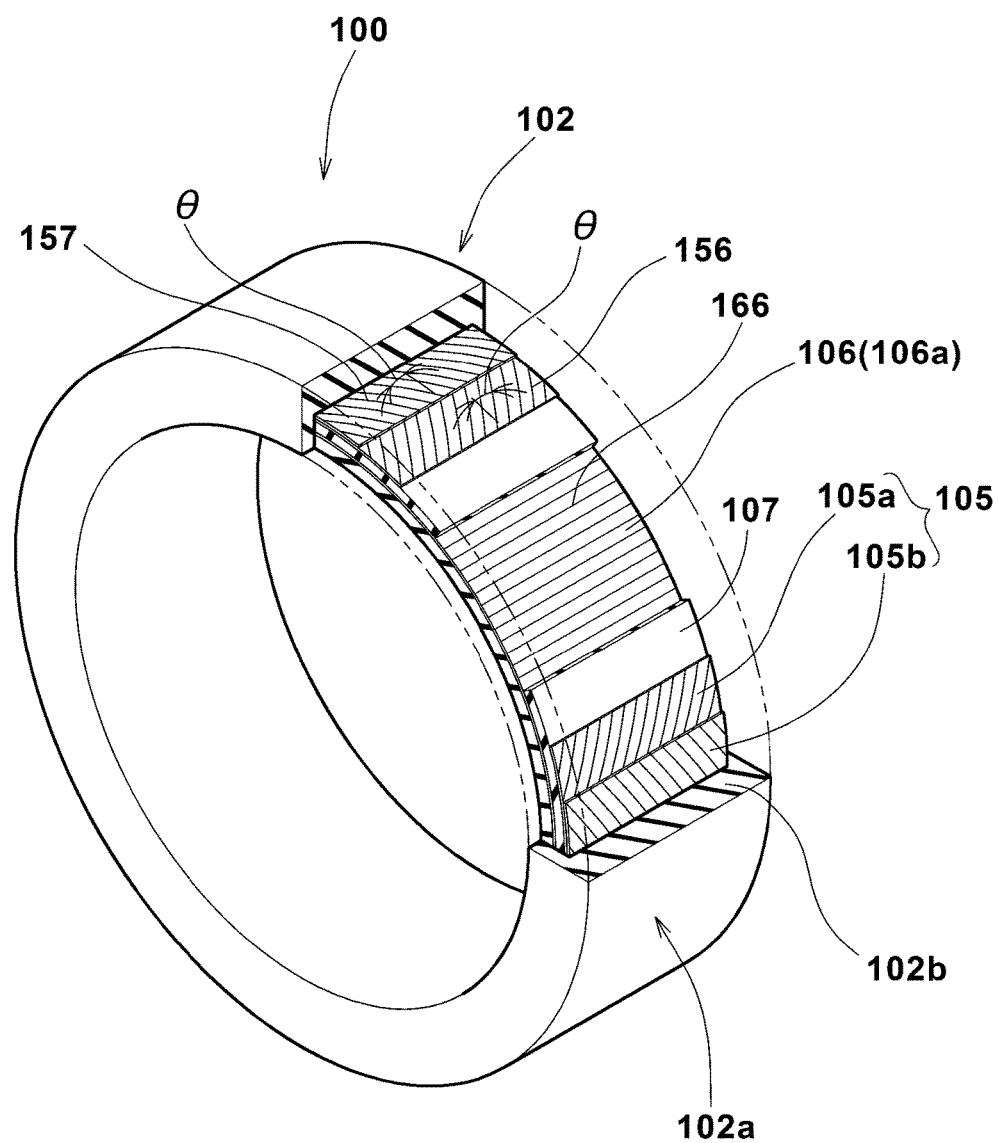
FIG. 5 a perspective view of another example of the inner reinforcing cord layer in FIG. 3.

FIG. 5 shows another embodiment of the third cord ply 106a. The third reinforcing cords 166 of the third cord ply 106a may be arranged in parallel with the tire axial direction as shown in FIG. 5.

Here, "in parallel with the tire axial direction" means that the third reinforcing cords 166 is substantially in parallel with the tire axial direction, and the angle θ3 of the third reinforcing cords 166 with respect to the tire circumferential direction is, for example, 90 +− about 5 degrees, considering the manufacturing tolerances.

By the third reinforcing cords 166 arranged in parallel with the tire axial direction, the rigidity in the tire axial direction of the tread ring 102 is increased. Thereby, when a large slip angle is give to the airless tire 100, the shape of the ground contacting surface 102a is stabilized, and the steering stability is improved. Further, the third cord ply 106a, which has the third reinforcing cords 166 arranged in parallel with the tire axial direction, can secure symmetry about a tire circumferential direction line while achieving a weight reduction owing to the single ply.

For each of the outer reinforcing cord layer 105 and the inner reinforcing cord layer 106, its symmetry about a circumferential direction line is important. If not symmetrical, the tread ring 102 is deformed, when loaded, by the torsion caused by the outer reinforcing cord layer 105 and the inner reinforcing cord layer 106, which results in a difficulty in smooth rolling.

In a pneumatic tire, the angle of belt cords with respect to the tire circumferential direction is generally limited within a certain range in order to suppress expansion of the tread portion caused by injecting air into the tire. On the other hand, in the case of the airless tire 100 in the present embodiment, since there is no need to consider the inner pressure, it is possible to set the angle θ of the first and second reinforcing cords 156, 157 in wider ranges. Specifically, it is preferred that the angle θ is 5 to 85 degrees in order to maintain the rigidity of the tread ring 102 in the tire axial direction and the tire circumferential direction.

In the present embodiment, the first cord ply 105a is formed as being radially innermost in the outer reinforcing cord layer 105. It may be possible to dispose at least one cord ply radially inside the first cord ply 105a.

Further, in the present embodiment, the second cord ply 105b is formed as being radially outermost in the outer reinforcing cord layer 105. It may be possible to dispose at least one cord ply radially outside the second cord ply 105b.

Such cord ply reinforces the tread ring 102 and increases the load bearing capacity of the airless tire 100, therefore, it is suitably applied to tires having a large tire load such as tires for commercial vehicles, for example.

Figure 6:
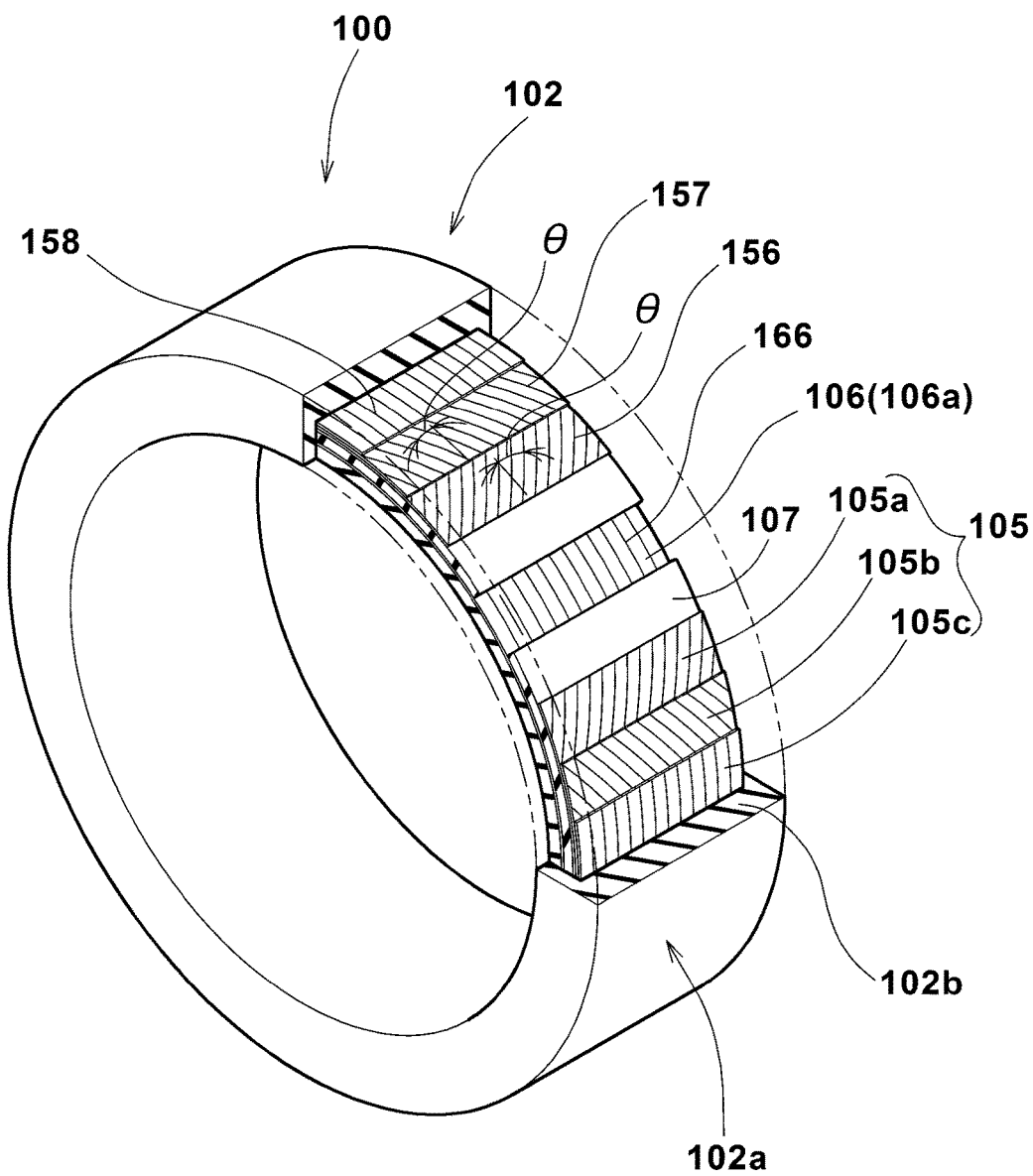
FIG. 6 a perspective view showing another example of the outer reinforcing cord layer in FIG. 3.

In an embodiment shown in FIG. 6, the outer reinforcing cord layer 105 further comprises a fourth cord ply 105c of fourth reinforcing cords 158 arranged radially outside the second cord ply 105b. Other components not illustrate in FIG. 6 are the same as those in the previous embodiments.

The fourth reinforcing cords 158 are arranged in parallel with the tire circumferential direction (i.e. the angle θ4 with respect to the tire circumferential direction is θ+−5 degrees as with the third reinforcing cords 166).

Such fourth reinforcing cords 158 increase the rigidity in the tire circumferential direction of the tread ring 102. Thereby, the shape of the ground contacting surface 121 is stabilized during deceleration and acceleration, and the brake performance and the traction performance are improved.

Further, the fourth cord ply 105c, which has the fourth reinforcing cords 158 arranged in parallel with the tire circumferential direction, can secure a symmetry about a tire circumferential line while achieving a weight reduction by the single ply.

It is preferred that the elastic modulus E4 of the fourth reinforcing cords 158 is not greater than the elastic modulus E0 of the first and the second reinforcing cords 156 and 157. If the elastic modulus E4 of the fourth reinforcing cords 158 is greater than the elastic modulus E0, the fourth cord ply 105c becomes a working ply, therefore, when a slip angle is given to the airless tire 100, there is a possibility that the cornering power cannot be sufficiently exerted and the cornering performance deteriorates.

For the fourth reinforcing cord 158, for example, organic fiber such as Nylon is suitably used.

Figure 7:
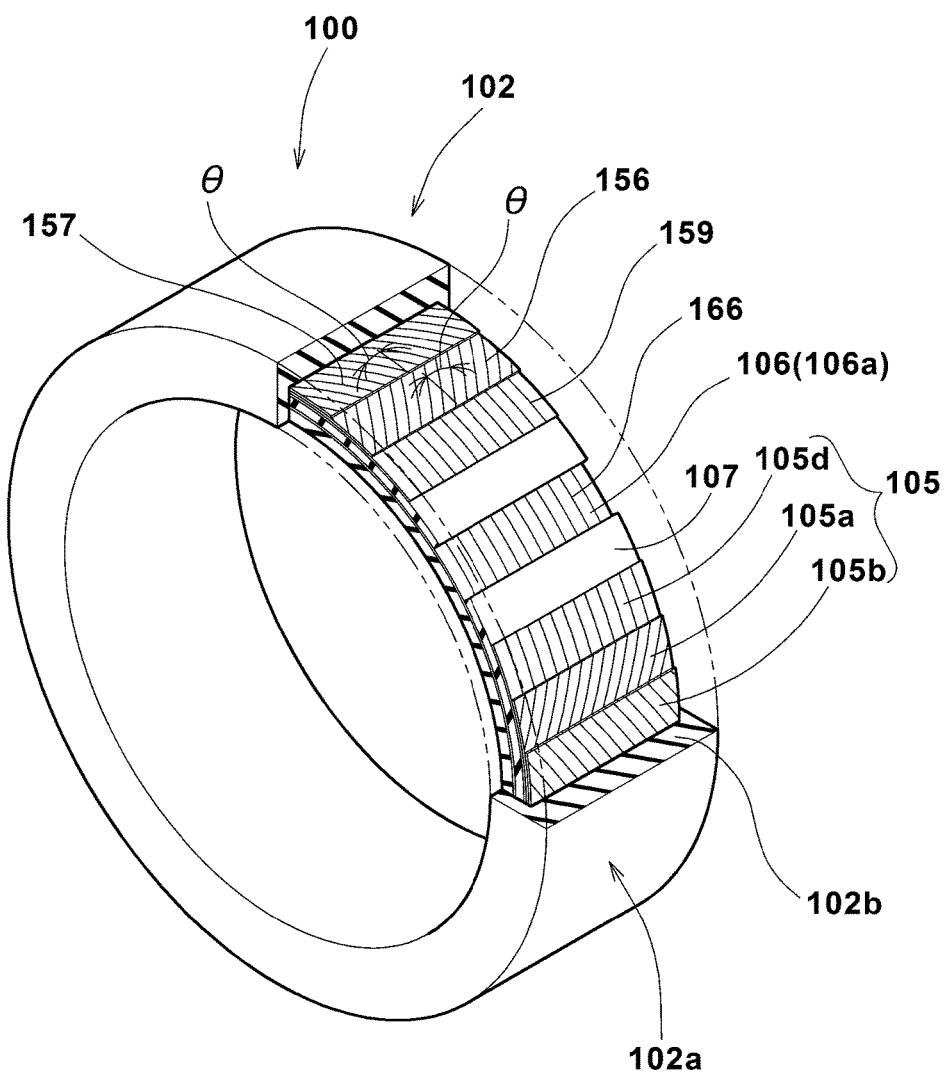
FIG. 7 a perspective view showing another example of the outer reinforcing cord layer in FIG. 3.

In FIG. 7, another embodiment of the outer reinforcing cord layer 105 is shown. Other components not described here are the same as those in the previous embodiments. In the embodiment shown in FIG. 7, the outer reinforcing cord layer 105 further includes a fifth cord ply 105d of fifth reinforcing cords 159 arranged radially inside the first cord ply 105a.

The fifth reinforcing cords 159 are arranged in parallel with the tire circumferential direction (i.e. the angle θ5 with respect to the tire circumferential direction is θ+−5 degrees as with the third reinforcing cords 166).

Such fifth reinforcing cords 159 increase the rigidity in the tire circumferential direction of the tread ring 102. Thereby, the shape of the ground contacting surface 121 is stabilized during deceleration and acceleration, and the brake performance and the traction performance are improved.

Further, the fifth cord ply 105d, which has the fifth reinforcing cords 159 arranged in parallel with the tire circumferential direction, can secure a symmetry about a tire circumferential line while achieving a weight reduction by the single ply.

A combination of the embodiments shown in FIGS. 6 and 7 may be possible, i.e. the outer reinforcing cord layer 105 may be provided with the fourth cord ply 105c disposed radially outside the second cord ply 105b and the fifth cord ply 105d disposed radially inside the first cord ply 105a.

Next, as shown in FIG. 4, the tread ring 102 has a reinforcement having a sandwich structure of the outer reinforcing cord layer 105, the inner reinforcing cord layer 106, and the shearing rubber layer 107. Thereby, tensile and compressive forces caused when the tread ring 102 is subjected to a load can be respectively supported by the outer reinforcing cord layer 105 and the inner reinforcing cord layer 106 disposed on both sides of the shearing rubber layer 107, and it is possible to suppress the deformation of the tread ring 102.

It is preferred that the radial distance D between the reinforcing cord disposed radially innermost among the reinforcing cords of the outer reinforcing cord layer 105 and the reinforcing cord disposed radially outermost among the reinforcing cords of the inner reinforcing cord layer 106 is not less than 3 mm.

It is especially preferred that the thickness of the shearing rubber layer 107 is not less than 3 mm.

Further, in order to sufficiently enhance the above described function of the tread ring 102 and thus to obtain excellent steering stability and low rolling resistance, the shearing rubber layer 107 employs the rubber compound G which satisfies the expressions (1) and (2). Thereby, deformation of the tread ring 102 is suppressed, and it is possible to obtain excellent steering stability and low rolling resistance. Furthermore, since the complex elastic modulus and the loss tangent of the rubber compound of the shearing rubber layer 107 are defined by the values at the temperature of 70 degrees C., excellent performances are certainly expressed in actual vehicle traveling.

Further, in order to obtain the steering stability which is stable under a driving condition long time from the start of driving, it is preferred that the rubber compound of the shearing rubber layer 107 satisfies the expression (3).

Furthermore, in order to secure the isotropy of the shearing rubber layer 107 and obtain excellent tire performance, etc., it is preferred that the rubber compound of the shearing rubber layer 107 satisfies the expression (4) and (5).

Even in the airless tire, if the electric resistance is large, static electricity accumulates in the car, and there is a possibility that an electro magnetic wave obstacle such as radio noise is caused. Accordingly, in order to prevent electrification of the tire, it is preferred that the volume resistivity value of the shearing rubber layer 107 is less than $1 \times 10^8$ ohm cm. The lower limit for the volume resistivity value is not particularly limited.

Regarding the rubber compound of the shearing rubber layer 107, the same rubber compound as in the first embodiment can be used. However, in the case of an airless tire, from the point of view of the low exothermicity, it is preferred that the DBP absorption of the carbon black is not less than 125 ml/100 g.

While detailed description has been made of the especially preferred embodiments of the present invention, the present invention can be embodied in various forms without being limited to the illustrated specific embodiments.

WORKING EXAMPLES

Working Example 1

According to the compositions shown in Table 1, ingredients other than a cross-linking agent and a vulcanizing accelerator were kneaded by the use of a Banbury mixer under the temperature of 150 degrees C. for 5 minutes to obtain a kneaded intermediate.

Next, the obtained kneaded intermediate was added with a cross-linking agent and a vulcanizing accelerator and kneaded together by using a biaxial open roll under the temperature of 80 degrees C. for 5 minutes to obtain the unvulcanized rubber compound. Then, the obtained unvulcanized rubber compound was vulcanized under the temperature of 150 degrees C. for 30 minutes to obtain the vulcanized rubber compound.

The obtained vulcanized rubber compound was measured in respect to the below listed physical properties, then the complex elastic modulus $E^*_{70}$, ratios $E^*_{70}/\tan \delta 70$, $E^*_{100}/E^*_{30}$, $EB_X/EBY$, $EB_X/EBZ$, ratios $TB_X/TBY$, $TB_X/TBZ$ which are related to the expressions (1) to (7) were calculated and the results are shown in Table 1.

Complex elastic modulus $E^*_{70}$ (unit: MPa) under initial strain of 10%, dynamic strain of 2%, temperature of 70 degrees C.

Loss tangent $\tan \delta 70$ under initial strain of 10%, dynamic strain of 2%, temperature of 70 degrees C.

Complex elastic modulus $E^*_{30}$ (unit: MPa) under initial strain of 10%, dynamic strain of 2%, temperature of 30 degrees C.

Complex elastic modulus $E^*_{100}$ (unit: MPa) under initial strain of 10%, dynamic strain of 2%, temperature of 100 degrees C.

Breaking elongation $EB_X$ in the x-axis direction, Breaking elongation $EB_Y$ in Y-axis direction, and Breaking elongation $EB_Z$ in z-axis direction (unit: %)

Breaking strength $EB_X$ in x-axis direction, Breaking strength $TB_Y$ in Y-axis direction, and Breaking strength $TB_Z$ in z-axis direction (unit: %)

<Viscoelasticity Measurement>

The complex modulus ($E^*$) and the loss tangent ($\tan \delta$) of the vulcanized rubber compound were measured at the temperatures of 100, 70 and 30 degrees C. by using a viscoelastic spectrometer (manufactured by Iwamoto Seisakusyo K.K.) under a frequency of 10 Hz, initial strain of 10% and dynamic strain of 2%.

<Tensile Test>

According to "Test methods for tensile properties of vulcanized rubbers and thermoplastic rubbers" in JIS-K-6251, and using a No. 3 dumbbell, tensile tests were carried out in each of the directions on the basis of the roll extruded direction being the x-axis direction, and the breaking elongation (EB) and the breaking strength (TB) of the vulcanized rubber compound were measured.

The measurements were carried out on the basis of the circumferential direction of the tire being the extruding direction of the roll, the width direction being the width direction of the roll, and the vertical direction being the thickness direction of the sample.

<Electric Conductivity Test>

The intrinsic resistivity (volume resistivity) was measured under a constant temperature of 23 degrees C. and a constant relative humidity of 55% with the applied voltage of 1000 V and other conditions according to JIS K6271 by using a ultrahigh resistance/very small electric current digital meter (R-8340A) manufactured by Advantest Corporation. when the measured values are lower than $1 \times 10^8$ ohm cm, they are indicated in Table 1 as "○".

The ingredients used in the rubber compounds listed in Table 1 were as follows.

NR1: highly-purified NR (prepared through the undermentioned exemplified manufacturing)

NR2: epoxydized natural rubber (ENR) (prepared through the undermentioned exemplified manufacturing)

NR3: all-purpose unmodified natural rubber (unmodified NR: TSR20)

BR: butadiene rubber containing 1, 2-syndiotactic polybutadiene crystals (SPB), VCR 617 manufactured by Ube Industries, Ltd. (SPB content: 15 to 18% by weight)

CB1: carbon black, PRINTEX XE2B manufactured by Evonik Degussa Japan Co., Ltd. (DBP absorption: 420 ml/100 g, BET specific surface area: 1000 m^2/g)

CB2: carbon black, N330 manufactured by Columbia Chemical Corporation

Fulleren: nano carbon, C60 manufactured by Frontier Carbon Corporation

Silica 1: ZEOSIL PREMIUM 200MP manufactured by Rhodia Corporation (nitrogen adsorption specific surface area (N2SA) 205 m^2/g, CTAB adsorption specific surface area 197 m^2/g)

Silica 2: AGILON 454 manufactured by PPG Industries (BET 140 m^2/g, CTAB 200 m^2/g)

Coupling agent 1: carbon coupling agent, 1, 2-Bis(benzimidazolyl-2) ethane manufactured by Shikoku Chemicals Corporation Coupling agent 2: silane coupling agent, NXT manufactured by Momentive Performance Materials Inc.

Coupling agent 3: silane coupling agent, Si266 manufactured by Evonik Degussa GmbH.

Plasticizer 1: low molecular ENR prepared through the undermentioned exemplified manufacturing Plasticizer 2: SANSO CIZER DOS manufactured by New Japan Chemical Co., Ltd.

Plasticizer 3: DIANA PROCESS OIL AH-24 manufactured by Idemitsu Kosan Co., Ltd.

Resin: 5P1068 manufactured by Nippon Shokubai Co., Ltd.

Stearic acid: one manufactured by NOF Corporation.

Zinc oxide 1: ZINCOX SUPER F-3 manufactured by HakusuiTech Co., Ltd. (average primary particle size: 50 nm)

Zinc oxide 2: zinc oxide grade three manufactured by HakusuiTech Co., Ltd. (average primary particle size of 1.0 micrometer)

Cross-linking agent 1: VULCUREN KA9188 manufactured by Lanxess AG.

Cross-linking agent 2: TACKIROL v200 manufactured by Taoka Chemical Co., Ltd.

Sulfur: CRYSTEX HSOT20 manufactured by Flexsys Inc. (insoluble sulfur comprising 80% by weight of sulfur and 20% by weight of oil)

Vulcanizing accelerator 1: hexamethylenetetramine (HMT), NOCCELER H manufactured by Ouchi Shinko Chemical Industrial Co., Ltd.

Vulcanizing accelerator 2: NOCCELER NS manufactured by ouchi Shinko Chemical Industrial Co., Ltd. (N-tert-butyl-2-benzothiazolyl sulfenamide)

Antiaging agent: NOCRAC 6c manufactured by ouchi Shinko Chemical Industrial Co., Ltd.

<Exemplified Manufacturing of NR1 (Highly-Purified NR)>

After the solid content concentration (DRC) of field latex was adjusted to 30% (w/v), the latex in amount of 1000 g was added with 10% aqueous solution of EMAL E-27C in amount of 25 g and 25% aqueous solution of NaOH in amount of 60 g, and saponified for 24 hours at room temperature, and a saponified natural rubber latex was prepared.

Then, it was added with the antioxidant dispersion in amount of 6 g, and stirred for 2 hours, and thereafter, diluted by adding water until the rubber concentration reached 15% (w/v). Further, the pH was adjusted to 4.0 by adding formic acid while stirring slowly, and thereafter, a cationic polymer flocculant was added, and the mixture was stirred for 2 minutes so that coagulation occurred. The obtained coagulum (coagulated rubber) had a diameter of approximately 0.5 to 5 mm.

The coagulum was taken out and immersed in 1000 ml of an aqueous solution of 2% by mass sodium carbonate for 4 hours at room temperature, and then the rubber was taken out.

The taken-out rubber and 2000 ml of water were stirred for 2 minutes and then dehydrated as much as possible, and this operation was repeated seven times.

Thereafter, 500 ml of water was added, and 2% by mass formic acid was added until the pH reached 4, followed by leaving the mixture for 15 minutes.

Further, the mixture was dehydrated as much as possible, added with water again, and stirred for 2 minutes. This cycle of operation was repeated three times.

Then water was squeezed off from the resultant rubber with a water squeezing roll to form the rubber into a sheet, followed by drying for 4 hours at 90 degrees C.

In this manner, a highly purified natural rubber (NR1) was prepared.

The obtained rubber had pH of 5 and the phosphorus content of 92 ppm.

<Exemplified Manufacturing of NR2 (ENR)>

Chemicals used were as follows.

30% hydrogen peroxide solution: 30% hydrogen peroxide solution manufactured by Kanto Chemical Co., Inc.

Glacial acetic acid: 99.7% glacial acetic acid manufactured by Kanto Chemical Co., Inc.

Surfactant agent: EMULGEN 120 manufactured by Kao Corporation.

57 g of glacial acetic acid and 107 g of a 30% hydrogen peroxide solution were stirred in a 300 ml Erlenmeyer flask and left for 24 hours, and a peracetic acid solution was prepared.

300 g of the NR1, 300 g of distilled water, and 3.6 g of the surfactant were mixed in a 1 L glass container and cooled down to 10 degrees C., and 35 g of the peracetic acid solution was added by dripping for 10 minutes with stirring.

After the dripping was finished, the latex solution was stirred for 5 minutes, and the solution was slowly added to 1 L of methanol to cause coagulation, then the coagulum was broken into pieces of approximately 1 cm in size, followed by leaving the coagulum pieces in 2 L of water overnight. Thereafter, the coagulum pieces were washed in water for several times, air dried for one day, and then dried under reduced pressure to obtain 176 g of ENR (NR2). Epoxidation rate of the NR2 was 3 mole %.

Measuring method of the epoxidation rate was as follows.

(Measurement of Epoxidation Rate)

The obtained ENR was dissolved in deuterated chloroform, and the ratio between the number of diene units not epoxidized and the number of epoxidized diene units was determined by nuclear magnetic resonance (NMR) spectrometry (JNM-ECA series manufactured by JEOL Ltd.), and the epoxidation rate was calculated based on the following formula:

(Epoxidation rate $E$=(number of epoxy included in main chain of rubber)/(number of diene units (including epoxidized units) included in main chain of polymer)×100.

<Exemplified Manufacturing of Plasticizer 1>

Using LIR-50 (liquid polyisoprene Mn=54000) manufactured by Kuraray Co., Ltd., low molecular ENR (Plasticizer 1) of 2% epoxidation rate was prepared in the same manner as the exemplified manufacturing of NR2.

TABLE 1

|  |  | Working example 1 | Working example 2 | Comparative example 1 | Comparative example 2 |
|---|---|---|---|---|---|
| Rubber component | NR1 (Highly Purified NR) | 100.0 |  |  |  |
|  | NR2 (ENR) |  | 100 |  |  |
|  | NR3 (Unmodified NR) |  |  | 100 | 70 |
|  | BR |  |  |  | 30 |
| Filler | CB1 (High Structure CB) | 55 | 5 |  |  |
|  | CB2 (N330) |  |  | 85 | 80 |
|  | Fullerene (Nano Carbon) | 10 |  |  |  |
|  | Silica 1 (200MP) |  | 50 |  |  |
|  | Silica 2 (Agilon 454) |  | 35 |  |  |
|  | Coupling Agent 1 (EBZ) | 8 |  |  |  |
|  | Coupling Agent 2 (NXT) |  | 4 |  |  |
|  | Coupling Agent 3 (Si266) |  | 2 |  |  |
| Cross-linking Agent | Cross-linking Agent 1 (KA9188) | 2 | 3 |  |  |
|  | Cross-linking Agent 2 (V200) | 3 | 2 |  |  |
|  | Sulfur | 5 | 5 | 8 | 8 |
| Zinc Oxide | Zinc Oxide 1 (Nano-Particle) | 8 | 10 |  |  |
|  | Zinc Oxide 2 |  |  | 10 | 10 |
| Plasticizer | Plasticizer 1 (Liquid IR) |  | 2 |  |  |
|  | Plasticizer 2 (DOS) | 2 |  |  |  |
|  | Plasticizer 3 (Oil) |  |  | 2 | 2 |
|  | Resin (PR12686 Resin) |  |  | 20 | 15 |

TABLE 1-continued

| | | Working example 1 | Working example 2 | Comparative example 1 | Comparative example 2 |
|---|---|---|---|---|---|
| Others | Stearic Acid | 1.5 | 1 | 1.5 | 1.5 |
| | Vulcanizing Accelerator 1 | 1.5 | 2 | 1.5 | 1.5 |
| | Vulcanizing Accelerator 2 | 2 | 2 | 2 | 2 |
| | Antioxidant | 1 | 1 | 1 | 1 |
| Physical Properties | $E^*_{70}$ (Expression (1)) | 120 | 112 | 92 | 112 |
| | $E^*_{70}/\tan\delta_{70}$ (Expression (2)) | 923 | 1258 | 562 | 622 |
| | $E^*_{100}/E^*_{30}$ (Expression (3)) | 0.82 | 0.90 | 0.51 | 0.68 |
| | $EB_X/EB_Y$ (Expression (4)) | 1.18 | 1.12 | 1.52 | 1.85 |
| | $EB_X/EB_Z$ (Expression (5)) | 1.08 | 1.06 | 1.38 | 1.76 |
| | $TB_X/TB_Y$ (Expression (6)) | 1.12 | 1.07 | 1.84 | 1.84 |
| | $TB_X/TB_Z$ (Expression (7)) | 1.06 | 1.03 | 2.45 | 2.51 |
| | Electric Conductivity | ○ | ○ | ○ | ○ |

Next, using the robber compounds listed in Table 1 as bead apexes, pneumatic tires for passenger cars (size 195/65R15) were experimentally manufactured, and evaluated in respect to the steering stability through an actual vehicle traveling test. The tires were substantially the same except for the rubber compositions of the bead apexes.

<Steering Stability>

Test tires were mounted on all wheels of a vehicle (domestically-produced front wheel drive vehicle, 2000 cc displacement) and run on a dry asphalt tire test course, and the steering stability (the steering response, grip and the like) during that time was sensory evaluated by the driver. The results are indicated by an index based on comparative Example 1 being 100. The larger numeric value is better.

<Rolling Resistance>

Using a rolling resistance testing machine, the rolling resistance was measured under the below listed conditions. The results are indicated by an index based on comparative Example 1 being 100. The smaller the numeric value is, the smaller the rolling resistance which means better.

Rim: 15×6JJ
Inner pressure: 230 kPa
Tire load: 3.43 kN
speed: 80 km/h

TABLE 2

| | Working Example 1 | Working Example 2 | Comparative Example 1 | Comparative Example 2 |
|---|---|---|---|---|
| $E^*_{70}$ | 120 | 112 | 92 | 112 |
| $\tan\delta_{70}$ | 0.130 | 0.089 | 0.163 | 0.180 |
| Steering Stability | 130 | 122 | 100 | 119 |
| Rolling Resistance | 90 | 78 | 100 | 105 |

Working Example 2

Next, working examples of the airless tire will be described. Preferred examples of the rubber compound of the shearing rubber layer of the airless tire are shown in Table 3.

TABLE 3

| | | Composition A | Composition B |
|---|---|---|---|
| Rubber component | NR1 (Highly Purified NR) | 100 | |
| | NR2 (ENR) | | 100 |
| Filler | CB1 (High Structure CB) | 55 | 5 |
| | Fullerene (Nano Carbon) | 10 | |

TABLE 3-continued

| | | Composition A | Composition B |
|---|---|---|---|
| | Silica 1 (200MP) | | 50 |
| | Silica 2 (Agilon 454) | | 35 |
| | Coupling Agent 1 (EBZ) | 8 | |
| | Coupling Agent 2 (NXT) | | 4 |
| | Coupling Agent 3 (Si266) | | 2 |
| Cross-linking Agent | Cross-linking Agent 1 (KA9188) | 2 | 3 |
| | Cross-linking Agent 2 (V200) | 3 | 2 |
| | Sulfur | 5 | 5 |
| Zinc Oxide | Zinc Oxide 1 (Nano-Particle) | 8 | 10 |
| Plasticizer | Plasticizer 1 (Liquid IR) | | 2 |
| | Plasticizer 2 (DOS) | 2 | |
| Others | Stearic Acid | 1.5 | 1 |
| | Vulcanizing Accelerator 1 | 1.5 | 2 |
| | Vulcanizing Accelerator 2 | 2 | 2 |
| | Antioxidant | 1 | 1 |
| Physical Properties | $E^*_{70}$ (Expression (1)) | 120 | 112 |
| | $\tan\delta_{70}$ | 0.130 | 0.089 |
| | $E^*_{70}/\tan\delta_{70}$ (Expression (2)) | 923 | 1258 |
| | $E^*_{100}/E^*_{30}$ (Expression (3)) | 0.82 | 0.90 |
| | $EB_X/EB_Y$ (Expression (4)) | 1.18 | 1.12 |
| | $TB_X/TB_Y$ (Expression (6)) | 1.12 | 1.07 |
| | Electric Conductivity | ○ | ○ |

The viscoelasticity, breaking elongation, breaking strength and electric conductivity in Table 3 are as described above.

Further, the ingredients of the rubber compounds shown in Table 3 were as follows.

NR1: Highly purified NR (prepared through the above-mentioned exemplified manufacturing)

NR2: Epoxidized natural rubber ENR (prepared through the above-mentioned exemplified manufacturing)

CB1: PRINTEX XE2B manufactured by Evonik Degussa Japan Co., Ltd. (DBP absorption: 420 ml/100 g, BET specific surface area: 1000 m^2/g)

Fulleren: C60 manufactured by Frontier Carbon Corporation

Silica 1: ZEOSIL PREMIUM 200MP manufactured by Rhodia Corporation (nitrogen adsorption specific surface area (N2SA) 205 m^2/g, CTAB specific surface area 197 m^2/g)

Silica 2: AGILON 454 manufactured by PPG Industries (BET specific surface area 140 m^2/g, CTAB 200 m^2/g)

Coupling agent 1: 1, 2-Bis(benzimidazolyl-2) ethane manufactured by Shikoku Chemicals Corporation Coupling agent 2: NXT manufactured by Momentive Performance Materials Inc.

Coupling agent 3: Si266 manufactured by Evonik Degussa GmbH.

Cross-linking agent 1: VULCUREN KA9188 manufactured by Lanxess AG.

Cross-linking agent 2: TACKIROL V200 manufactured by Taoka Chemical Co., Ltd.

Sulfur: CRYSTEX HSOT20 manufactured by FlexSys Inc. (insoluble sulfur comprising 80% by weight of sulfur and 20% by weight of oil)

Zinc oxide 1: ZINCOX SUPER F-3 manufactured by HakusuiTech Co., Ltd. (average primary particle size: 50 nm)

Plasticizer 1: low molecular ENR prepared through the above-mentioned exemplified manufacturing Plasticizer 2: SANSO CIZER DOS manufactured by New Japan Chemical Co., Ltd.

Stearic acid: manufactured by NOF Corporation vulcanizing accelerator 1: hexamethylenetetramine (HMT), NOCCELER H manufactured by ouchi Shinko Chemical Industrial Co., Ltd.

Vulcanizing accelerator 2: NOCCELER NS manufactured by ouchi Shinko Chemical Industrial Co., Ltd. (N-tert-butyl-2-benzothiazolyl sulfenamide)

Antiaging agent: NOCRAC 6C manufactured by ouchi Shinko Chemical Industrial Co., Ltd.

Next, based on the structures shown in FIG. 2 and FIG. 3, airless tires (corresponding to size 145/70R12) were experimentally manufactured according to the specifications listed in Table 4, and tested for the appearance, the steering stability, the ride comfort, the rolling resistance and the durability.

The tires had substantially the same specifications except for the tread rings, and the spokes were formed integrally with the tread ring and the hub by a cast molding method using a urethane resin (thermosetting resin).

For the reinforcing cords of the outer reinforcing cord layer and inner reinforcing cord layer, steel cords were used.

Further, in the working examples and the comparative examples, the physical properties of the rubber compounds used for the shearing rubber layers were adjusted by changing the contents of the ingredients on the basis of the compositions A and B shown in Table 3.

The test methods were as follows.

<Appearance>

Tester sensory judged whether the tread ring of each of the airless tires was distorted or not. If not distorted, it was indicated by "O", and if distorted, indicated by "X".

<Steering Stability and Ride Comfort>

The test tires were mounted on the four wheels of a vehicle (compact EV, trade name: tomos), and during running on a dry asphalt road surface of a tire test course with the driver being the only member in the vehicle, the steering stability and the ride comfort were sensory evaluated by the driver through a ten point method. The larger numeric value is better. The airless tires which were judged as "X (distorted)" in the appearance evaluation, were not evaluated in respect to the steering stability, the ride comfort, the rolling resistance and the durability.

<Rolling Resistance>

The rolling resistance factor (rolling resistance/load× 10^4) measured by using the rolling resistance testing machine are indicated by an index based on comparative Example 1 being 100. The smaller numeric value is better.

<Durability>

Using a test drum, the test tires were run for 20 km at a speed (40 km/h) with a tire load (1.07 kN) on the drum. Then, the tires which completed the full distance were disassembled and inspected on the damage state.

The results are indicated as

"⊚" if no damage was found,

"○" if a slight sign of damage was found,

"Δ" if partially damaged although still usable,

"x" if damaged even though still usable.

TABLE 4

| Shearing Rubber Layer | Comp. Example 1 | Working Example 1 | Working Example 2 | Working Example 3 | Working Example 4 | Working Example 5 | Working Example 6 | Working Example 7 | Working Example 8 | Working Example 9 |
|---|---|---|---|---|---|---|---|---|---|---|
| $E^*_{70}$ (Expression (1)) | 80 | 95 | 112 | 120 | 153 | 112 | 112 | 112 | 112 | 112 |
| $E^*_{70}/\tan\delta_{70}$ (Expression (2)) | 500 | 818 | 1258 | 923 | 1700 | 1258 | 1258 | 1258 | 1258 | 1258 |
| $E^*_{100}/E^*_{30}$ (Expression (3)) | 0.5 | 0.93 | 0.9 | 0.82 | 0.81 | 0.9 | 0.9 | 0.9 | 0.9 | 0.9 |
| $EB_X/EB_Y$ (Expression (4)) | 1.6 | 1.09 | 1.12 | 1.18 | 1.18 | 1.12 | 1.12 | 1.12 | 1.12 | 1.12 |
| $TB_X/TB_Y$ (Expression (5)) | 1.6 | 1.05 | 1.07 | 1.12 | 1.18 | 1.07 | 1.07 | 1.07 | 1.07 | 1.07 |
| Electric Conductivity | ○ | ○ | ○ | ○ | ○ | ○ | ○ | ○ | ○ | ○ |
| Outer Reinforcing Cord Layer | 2 | 2 | 2 | 2 | 2 | 2 | 2 | 2 | 2 | 2 |
| Inner Reinforcing Cord Layer | 1 | 1 | 1 | 1 | 1 | 1 | 1 | 1 | 2 | 1 |
| Angle θ of First Reinforcing Cord (°) | 21 | 21 | 21 | 21 | 21 | 21 | 0 | 21 | 21 | 21 |
| Angle θ of Second Reinforcing Cord (°) | −21 | −21 | −21 | −21 | −21 | −21 | 0 | −21 | −21 | −21 |
| Angle θ3 of Third Reinforcing Cord (°) | 0 | 0 | 0 | 0 | 0 | 0 | 21 | 21 | 21/−21 | 90 |
| Fourth Cord Ply | Absent | Absent | Absent | Absent | Absent | Absent | Absent | Absent | Absent | Absent |
| Angle θ4 of Fourth Reinforcing Cord (°) | — | — | — | — | — | — | — | — | — | — |
| Elastic Modulus of Fourth Reinforcing Cord | — | — | — | — | — | — | — | — | — | — |
| Fifth Cord Ply | Absent | Absent | Absent | Absent | Absent | Absent | Absent | Absent | Absent | Absent |
| Angle θ5 of Fifth Reinforcing Cord (°) | — | — | — | — | — | — | — | — | — | — |
| Distance D (mm) | 4 | 4 | 4 | 4 | 4 | 3 | 4 | 4 | 4 | 4 |
| Appearance Characteristics | ○ | ○ | ○ | ○ | ○ | ○ | X | X | ○ | ○ |

TABLE 4-continued

| Shearing Rubber Layer | | | | | | | | | | |
|---|---|---|---|---|---|---|---|---|---|---|
| Steering Stability | 5 | 6.5 | 7 | 7 | 7.5 | 7 | — | — | 7 | 6 |
| Ride Comfort | 6 | 6 | 6 | 6 | 5.5 | 6.5 | — | — | 5.5 | 7 |
| Rolling Resistance | 100 | 86 | 90 | 93 | 95 | 95 | — | — | 110 | 95 |
| Durability | ○ | ⊚ | ⊚ | ⊚ | ⊚ | ⊚ | — | — | ○ | Δ |

| Shearing Rubber Layer | Working Example 10 | Working Example 11 | Working Example 12 | Working Example 13 | Working Example 14 | Working Example 15 | Working Example 16 | Working Example 17 | Working Example 18 |
|---|---|---|---|---|---|---|---|---|---|
| $E^{*}_{70}$ (Expression (1)) | 112 | 112 | 112 | 112 | 112 | 112 | 112 | 112 | 112 |
| $E^{*}_{70}/\tan\delta_{70}$ (Expression (2)) | 1258 | 1258 | 1258 | 1258 | 1258 | 1258 | 1258 | 1258 | 1258 |
| $E^{*}_{100}/E^{*}_{30}$ (Expression (3)) | 0.9 | 0.9 | 0.9 | 0.9 | 0.9 | 0.9 | 0.9 | 0.9 | 0.9 |
| $EB_X/EB_Y$ (Expression (4)) | 1.12 | 1.12 | 1.12 | 1.12 | 1.12 | 1.12 | 1.12 | 1.12 | 1.12 |
| $TB_X/TB_Y$ (Expression (5)) | 1.07 | 1.07 | 1.07 | 1.07 | 1.07 | 1.07 | 1.07 | 1.07 | 1.07 |
| Electric Conductivity | ○ | ○ | ○ | ○ | ○ | ○ | ○ | ○ | ○ |
| Outer Reinforcing Cord Layer | 3 | 3 | 4 | 2 | 3 | 3 | 3 | 3 | 3 |
| Inner Reinforcing Cord Layer | 2 | 1 | 1 | 1 | 1 | 1 | 4 | 3 | 1 |
| Angle θ of First Reinforcing Cord (°) | 21 | 21 | 21 | 21 | 21 | 21 | 21 | 21 | 21 |
| Angle θ of Second Reinforcing Cord (°) | −21 | −21 | −21 | −21 | −21 | −21 | −21 | −21 | −21 |
| Angle θ3 of Third Reinforcing Cord (°) | 21/−21 | 0 | 0 | 0 | 0 | 0 | 21/−21/21/−21 | 21/−21/21 | 0/0/0 |
| Fourth Cord Ply | Absent | Absent | Absent | Absent | Present | Present | Absent | Absent | Absent |
| Angle θ4 of Fourth Reinforcing Cord (°) | — | — | — | — | 0 | 0 | — | — | — |
| Elastic Modulus of Fourth Reinforcing Cord | — | — | — | — | E4 < E0 | E4 > E0 | — | — | — |
| Fifth Cord Ply | Present | Present | Present | Absent | Absent | Absent | Present | Present | Present |
| Angle θ5 of Fifth Reinforcing Cord (°) | 0 | 0 | 21/−21 | — | — | — | 0 | 0 | 0 |
| Distance D (mm) | 4 | 4 | 4 | 4 | 4 | 4 | 4 | 4 | 4 |
| Appearance Characteristics | ○ | ○ | ○ | ○ | ○ | ○ | ○ | X | ○ |
| Steering Stability | 7 | 7 | 7 | 7 | 7 | 6 | 7 | — | 7 |
| Ride Comfort | 6 | 6 | 6 | 6 | 6 | 6 | 5 | — | 5.5 |
| Rolling Resistance | 100 | 95 | 95 | 95 | 95 | 95 | 110 | — | 105 |
| Durability | ○ | ⊚ | ⊚ | ⊚ | ○ | ○ | ⊚ | — | ⊚ |

| Shearing Rubber Layer | Working Example 19 | Working Example 20 | Working Example 21 | Working Example 22 | Working Example 23 | Working Example 24 | Working Example 25 | Working Example 26 | Working Example 27 |
|---|---|---|---|---|---|---|---|---|---|
| $E^{*}_{70}$ (Expression (1)) | 112 | 112 | 112 | 112 | 112 | 112 | 112 | 112 | 112 |
| $E^{*}_{70}/\tan\delta_{70}$ (Expression (2)) | 1258 | 1258 | 1258 | 1258 | 1258 | 1258 | 1258 | 1258 | 1258 |
| $E^{*}_{100}/E^{*}_{30}$ (Expression (3)) | 0.9 | 0.9 | 0.9 | 0.9 | 0.9 | 0.9 | 0.9 | 0.9 | 0.9 |
| $EB_X/EB_Y$ (Expression (4)) | 1.12 | 1.12 | 1.12 | 1.12 | 1.12 | 1.12 | 1.12 | 1.12 | 1.12 |
| $TB_X/TB_Y$ (Expression (5)) | 1.07 | 1.07 | 1.07 | 1.07 | 1.07 | 1.07 | 1.07 | 1.07 | 1.07 |
| Electric Conductivity | ○ | ○ | ○ | ○ | ○ | ○ | ○ | ○ | ○ |
| Outer Reinforcing Cord Layer | 2 | 2 | 2 | 2 | 2 | 2 | 2 | 2 | 2 |
| Inner Reinforcing Cord Layer | 2 | 1 | 1 | 1 | 1 | 1 | 1 | 1 | 1 |
| Angle θ of First Reinforcing Cord (°) | 21 | 7 | 5 | 3 | 80 | 85 | 87 | 21 | 21 |
| Angle θ of Second Reinforcing Cord (°) | −21 | −7 | −5 | −3 | −80 | −85 | −87 | −21 | −21 |
| Angle θ3 of Third Reinforcing Cord (°) | 21/−21 | 0 | 0 | 0 | 0 | 0 | 0 | 0 | 0 |
| Fourth Cord Ply | Absent | Absent | Absent | Absent | Absent | Absent | Absent | Absent | Absent |
| Angle θ4 of Fourth Reinforcing Cord (°) | — | — | — | — | — | — | — | — | — |
| Elastic Modulus of Fourth Reinforcing Cord | — | — | — | — | — | — | — | — | — |
| Fifth Cord Ply | Absent | Absent | Absent | Absent | Absent | Absent | Absent | Absent | Absent |
| Angle θ5 of Fifth Reinforcing Cord (°) | — | — | — | — | — | — | — | — | — |
| Distance D (mm) | 4 | 4 | 4 | 4 | 4 | 4 | 4 | 2 | 1.5 |
| Appearance Characteristics | ○ | ○ | ○ | ○ | ○ | ○ | ○ | ○ | ○ |

TABLE 4-continued

| | | | | | | | | | |
|---|---|---|---|---|---|---|---|---|---|
| Steering Stability | 7 | 7 | 6.5 | 6 | 7 | 6.5 | 6 | 6.5 | 6 |
| Ride Comfort | 6 | 6 | 6 | 6 | 6 | 6 | 5 | — | 5 |
| Rolling Resistance | 90 | 85 | 85 | 85 | 95 | 95 | 95 | 110 | 130 |
| Durability | ⊚ | ⊚ | ⊚ | ⊚ | ⊚ | ⊚ | ⊚ | Δ | X |

DESCRIPTION OF THE REFERENCE NUMERALS 1 pneumatic tire
100 airless tire
102 tread ring
103 hub
104 spoke
105 outer reinforcing cord layer
106 inner reinforcing cord layer
107 shearing rubber layer
102b tread rubber
151 first cord ply
152 second cord ply
153 fourth cord ply
154 fifth cord ply
156 first reinforcing cord
157 second reinforcing cord
158 fourth reinforcing cord
159 fifth reinforcing cord
161 third cord ply
166 third reinforcing cord

The invention claimed is:

1. An airless tire comprising a rubber member made of a rubber composition having a complex elastic modulus $E^*_{70}$ (unit: MPa) and a loss tangent tan $\delta_{70}$ under the initial strain of 10%, the dynamic strain of 2%, and the temperature of 70 degrees C., satisfy the following expressions (1) and (2):

$$90 < E^*_{70} < 250 \tag{1}$$

$$E^*_{70}/\tan \delta_{70} > 800 \tag{2}$$

2. The airless tire as set forth in claim 1, wherein
the rubber composition comprising a rubber component, a filler and a cross-linking agent,
the rubber component is one or more kinds of polymers selected from the group consisting of natural rubber (NR), isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), isobutylene-isoprene rubber (IIR), and halogenated butyl rubber (X-IIR),
the filler is carbon black and/or silica for reinforcing the rubber composition, and
the cross-linking agent is one selected from the group consisting of sulfur, organic cross-linking agents, and organic-inorganic hybrid cross-linking agents.

3. An airless tire comprising
a cylindrical tread ring provided with a ground contacting surface,
a hub disposed radially inside the tread ring and fixed to a vehicle axle, and
a spoke connecting the tread ring and the hub,
wherein,
the tread ring comprises
a tread rubber forming the ground contacting surface,
an outer reinforcing cord layer disposed closest to the tread rubber,
an inner reinforcing cord layer disposed radially inside the outer reinforcing cord layer, and
a shearing rubber layer disposed between the outer reinforcing cord layer and the inner reinforcing cord layer,
the shearing rubber layer has a complex elastic modulus $E^*_{70}$ (unit: MPa) and a loss tangent tan $\delta_{70}$ under the initial strain of 10%, the dynamic strain of 2%, and the temperature of 70 degrees C. which satisfy following expressions (1) and (2):

$$90 < E^*_{70} < 250 \tag{1}$$

$$E^*_{70}/\tan \delta_{70} > 800 \tag{2}$$

4. The airless tire as set forth in claim 3, wherein the shearing rubber layer has
a complex elastic modulus $E^*_{30}$ (unit: MPa) under the initial strain of 10%, the dynamic strain of 2%, and the temperature of 30 degrees C., and
a complex elastic modulus $E^*_{100}$ (unit: MPa) under the initial strain of 10%, the dynamic strain of 2%, and the temperature of 100 degrees C.
which satisfy a following expression (3):

$$E^*_{100}/E^*_{30} > 0.8 \tag{3}$$

5. The airless tire as set forth in claim 3, wherein the shearing rubber layer has
a breaking elongation $EB_X$ in the tire circumferential direction and a breaking elongation $EB_Y$ in the tire axial direction which satisfy a following expression (4), and
a breaking strength $TB_X$ in the tire circumferential direction and a breaking strength $TB_Y$ in the tire axial direction which satisfy a following expression (5):

$$0.85 < EB_X/EB_Y < 1.2 \tag{4}$$

$$0.85 < TB_X/TB_Y < 1.2 \tag{5}$$

6. The airless tire as set forth in claim 3, wherein
the shearing rubber layer has a volume resistivity less than $1 \times 10^8$ ohm cm.

7. The airless tire as set forth in claim 3, wherein reinforcing cords of the outer reinforcing cord layer and reinforcing cords of the inner reinforcing cord layer are steel cords.

8. The airless tire as set forth in claim 3, wherein, the outer reinforcing cord layer comprise
a first cord ply including first reinforcing cords arranged to incline with respect to the tire circumferential direction, and
a second cord ply disposed radially outside the first cord ply and including second reinforcing cords arranged to incline with respect to the tire circumferential direction at the same angle as and to the opposite direction to the first reinforcing cords, and
the inner reinforcing cord layer comprises
a third cord ply including third reinforcing cords arranged in parallel with the tire circumferential direction or the tire axial direction.

9. The airless tire as set forth in claim 8, wherein
the outer reinforcing cord layer further comprises a fourth cord ply disposed radially outside the second cord ply and including fourth reinforcing cords.

10. The airless tire as set forth in claim 9, wherein
the fourth reinforcing cords are arranged in parallel with the tire circumferential direction, and an elastic modulus of the fourth reinforcing cords is not greater than elastic moduli of the first reinforcing cords and the second reinforcing cords.

11. The airless tire as set forth in claim 8, wherein
the outer reinforcing cord layer further comprises a fifth cord ply disposed radially inside the first cord ply and including fifth reinforcing cords.

12. The airless tire as set forth in claim 11, wherein
the fifth reinforcing cords are arranged in parallel with the tire circumferential direction.

13. The airless tire as set forth in claim 8, wherein
the third reinforcing cords are arranged in parallel with the tire circumferential direction.

14. The airless tire as set forth in claim 8, wherein
an angle θ of the first reinforcing cords with respect to the tire circumferential direction is 5 to 85 degrees.

15. The airless tire as set forth in claim 8, wherein
a radial distance between
the reinforcing cord disposed radially innermost among the reinforcing cords of the outer reinforcing cord layer and
the reinforcing cord disposed radially outermost among the reinforcing cords of the inner reinforcing cord layer is not less than 3 mm.

16. The airless tire as set forth in claim 3, wherein
the shearing rubber layer is made of a rubber composition comprising a rubber component, a filler and a cross-linking agent.

17. The airless tire as set forth in claim 16, wherein
the rubber component is one or more kinds of polymers selected from the group consisting of natural rubber (NR), isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), isobutylene-isoprene rubber (IIR), and halogenated butyl rubber (X-IIR).

18. The airless tire as set forth in claim 17, wherein the filler is carbon black and/or silica for reinforcing the rubber composition.

19. The airless tire as set forth in claim 16, wherein
the cross-linking agent is one selected from the group consisting of sulfur, organic cross-linking agents, and organic-inorganic hybrid cross-linking agents.

20. The airless tire as set forth in claim 3, wherein
the shearing rubber layer is made of a rubber composition comprising a rubber component, a filler and a cross-linking agent,
the rubber component is one or more kinds of polymers selected from the group consisting of natural rubber (NR), isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), isobutylene-isoprene rubber (IIR), and halogenated butyl rubber (X-IIR),
the filler is carbon black and/or silica for reinforcing the rubber composition, and
the cross-linking agent is one selected from the group consisting of sulfur, organic cross-linking agents, and organic-inorganic hybrid cross-linking agents.

* * * * *